United States Patent
Miura

(10) Patent No.: US 9,557,892 B2
(45) Date of Patent: Jan. 31, 2017

(54) SYSTEMS AND METHODS FOR ORGANIZING AND DISPLAYING HIERARCHICAL DATA STRUCTURES IN COMPUTING DEVICES

(71) Applicant: Kentaro Miura, San Francisco, CA (US)

(72) Inventor: Kentaro Miura, San Francisco, CA (US)

(73) Assignee: DouZen, Inc., San Francisco, CA (US)

( * ) Notice: Subject to any disclaimer, the term of this patent is extended or adjusted under 35 U.S.C. 154(b) by 257 days.

(21) Appl. No.: 14/088,293

(22) Filed: Nov. 22, 2013

(65) Prior Publication Data

US 2014/0157188 A1 Jun. 5, 2014

Related U.S. Application Data

(63) Continuation-in-part of application No. 13/685,603, filed on Nov. 26, 2012.

(60) Provisional application No. 61/629,804, filed on Nov. 26, 2011.

(51) Int. Cl.
*G06F 3/00* (2006.01)
*G06F 3/0482* (2013.01)
*G06F 3/0481* (2013.01)
*G06F 3/0485* (2013.01)
*G06F 3/0488* (2013.01)

(52) U.S. Cl.
CPC .......... *G06F 3/0482* (2013.01); *G06F 3/0485* (2013.01); *G06F 3/0488* (2013.01); *G06F 3/04817* (2013.01); *G06F 3/04883* (2013.01); *G06F 3/04886* (2013.01)

(58) Field of Classification Search
CPC G06F 3/0481; G06F 9/4445; G06F 17/30873; G06F 3/0482; G09G 2340/0464; G09G 2340/0407

See application file for complete search history.

(56) References Cited

U.S. PATENT DOCUMENTS

| | | | |
|---|---|---|---|
| 2006/0218478 A1* | 9/2006 | Nonclercq | G06F 17/30572 715/206 |
| 2010/0251170 A1* | 9/2010 | Louch | G06F 17/30861 715/810 |
| 2011/0249086 A1* | 10/2011 | Guo | H04N 7/147 348/14.12 |
| 2011/0265041 A1* | 10/2011 | Ganetakos | A63F 13/12 715/834 |

* cited by examiner

*Primary Examiner* — Anil N Kumar
(74) *Attorney, Agent, or Firm* — Carr & Ferrell LLP

(57) ABSTRACT

Systems and methods for organizing and displaying data structures in computing devices are provided herein. An exemplary method includes generating a GUI that includes a first plurality of selectable objects that are arranged in a first layout on the GUI, receiving a selection of one of the first plurality selectable objects, replacing the first plurality of selectable objects with a second plurality of selectable objects that are arranged in a second layout on the GUI, the second layout being different in visual appearance from the first layout, transforming the first plurality of selectable objects into a first set of icons that are arranged in an arcuate pattern, the first set of icons being shrunken versions of the first plurality of selectable objects, and displaying the first set of icons on a first layer of the GUI above the second plurality of selectable objects that are displayed on a second layer.

15 Claims, 35 Drawing Sheets

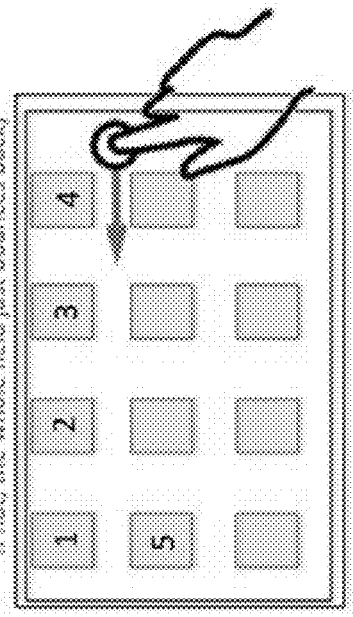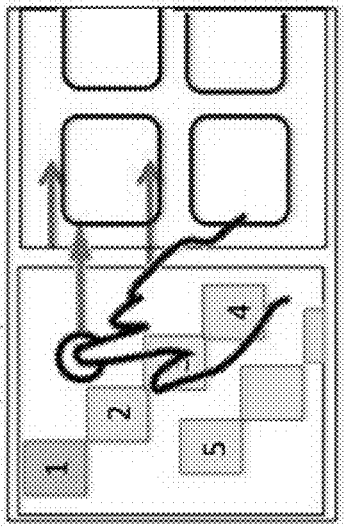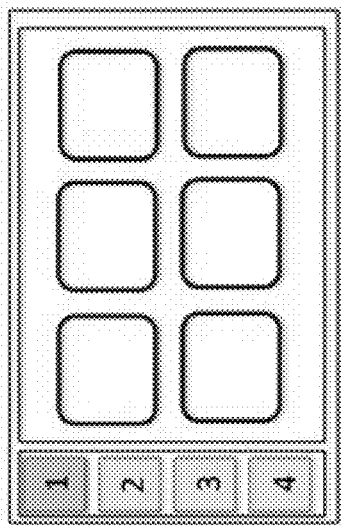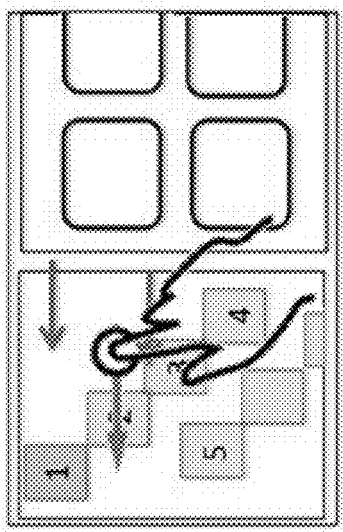
FIG. 5

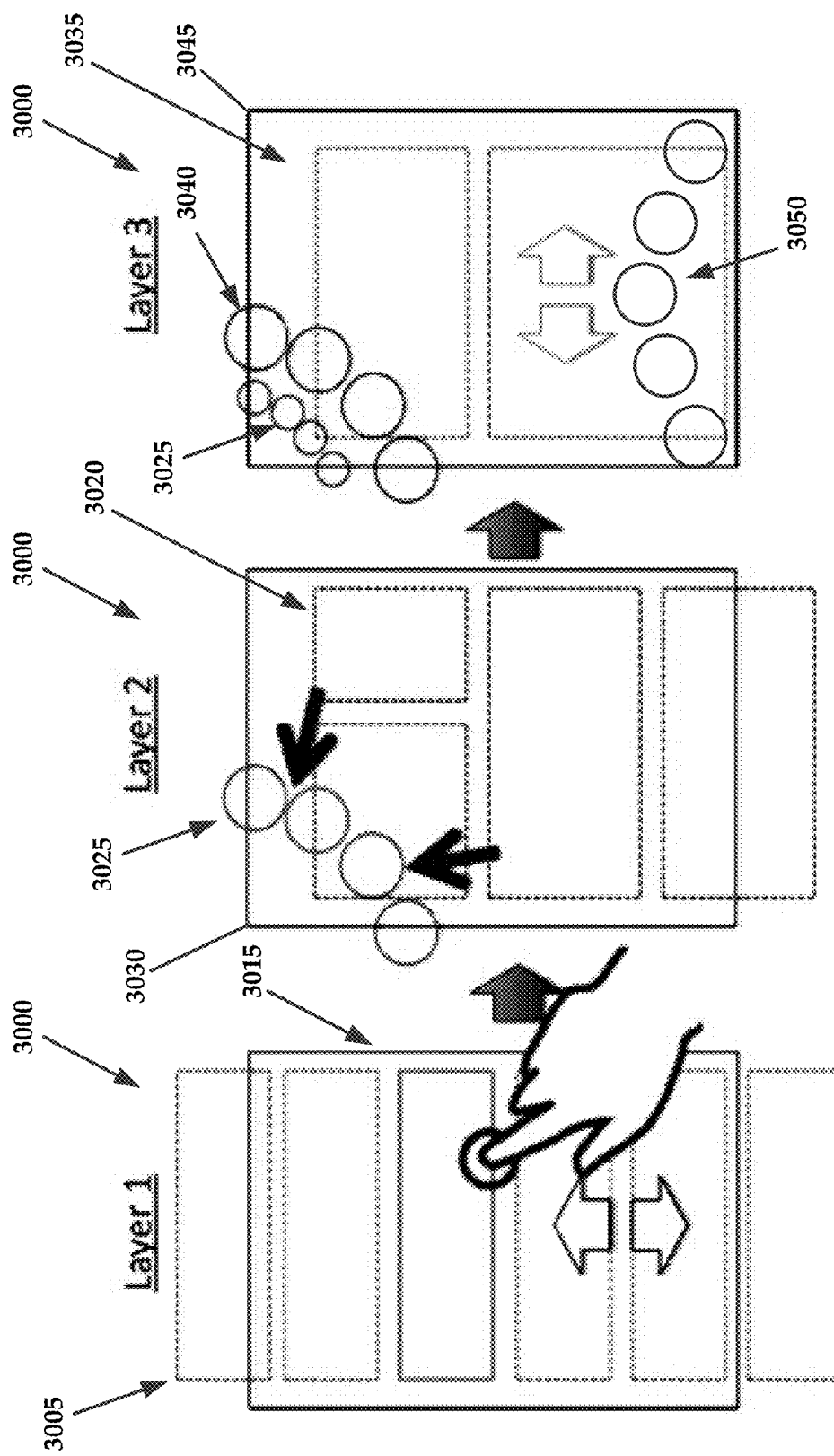

SYSTEMS AND METHODS FOR ORGANIZING AND DISPLAYING HIERARCHICAL DATA STRUCTURES IN COMPUTING DEVICES

CROSS-REFERENCE TO RELATED APPLICATIONS

This non-provisional U.S. patent application is a continuation-in-part of U.S. patent application Ser. No. 13/685,603, filed on Nov. 26, 2012, titled "Systems and Methods for Organizing and Displaying Hierarchical Data Structures in Computing Devices", which claims the priority benefit of U.S. provisional application Ser. No. 61/629,804, filed on Nov. 26, 2011, titled "Method and Apparatus for Organizing and Navigating Through Hierarchical Data Structure in Computing Devices", all of which are hereby incorporated herein by reference herein in their entireties including all references cited therein.

FIELD OF THE INVENTION

The present technology may be generally described as providing systems and methods for organizing and displaying data structures in computing devices. The present technology provides graphical user interfaces that allow for efficient and user-friendly representations of data structures, such as data organized in to hierarchical structures.

SUMMARY OF THE PRESENT TECHNOLOGY

According to some embodiments, the present technology may be directed to a method for providing a graphical user interface (GUI), comprising: (a) generating a GUI that includes a first plurality of selectable objects that are arranged in a first layout on the GUI; (b) receiving a selection of one of the first plurality selectable objects; (c) replacing the first plurality of selectable objects with a second plurality of selectable objects that are arranged in a second layout on the GUI, the second layout being different in visual appearance from the first layout; (d) transforming the first plurality of selectable objects into a first set of icons that are arranged in an arcuate pattern, the first set of icons being shrunken versions of the first plurality of selectable objects; and (e) displaying the first set of icons on a first layer of the GUI above the second plurality of selectable objects that are displayed on a second layer of the GUI.

According to some embodiments, the present technology may be directed to a method, comprising: (a) generating a GUI that includes a first plurality of selectable objects that are arranged onto a first layer on the GUI, the first plurality of selectable objects being arranged in an arcuate pattern around a corner of the GUI, the first plurality of selectable objects represented as visual icons; (b) displaying an enlargement of one of the first plurality of selectable objects in a primary frame on a second layer of the GUI; and (b) highlighting the selected one of the first plurality of selectable objects in the arcuate pattern.

According to other embodiments, the present technology is directed to a system that comprises (a) a processor; and (b) a memory for storing logic, the logic being executed by the processor to provide a graphical user interface (GUI) by: (i) generating a GUI that includes a first plurality of selectable objects that are arranged in a first layout on the GUI; (ii) receiving a selection of one of the first plurality selectable objects; (iii) replacing the first plurality of selectable objects with a second plurality of selectable objects that are arranged in a second layout on the GUI, the second layout being different in visual appearance from the first layout; (iv) transforming the first plurality of selectable objects into a first set of icons that are arranged in an arcuate pattern, the first set of icons being shrunken versions of the first plurality of selectable objects; and (v) displaying the first set of icons on a first layer of the GUI above the second plurality of selectable objects that are displayed on a second layer of the GUI.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 5 illustrates an exemplary sequence that shows how the present technology remembers a prior view;

FIG. 30 illustrates a GUI that comprises a scrollable view of a plurality of selectable objects;

FIG. 31 illustrates a GUI that comprises an arcuate grouping of selectable objects, such as icons that are displayed in a second layer above a first layer;

FIG. 32 illustrates two arcuate groupings of selectable objects that are arranged in an annular pattern;

DESCRIPTION OF EXEMPLARY EMBODIMENTS

Figure 1:
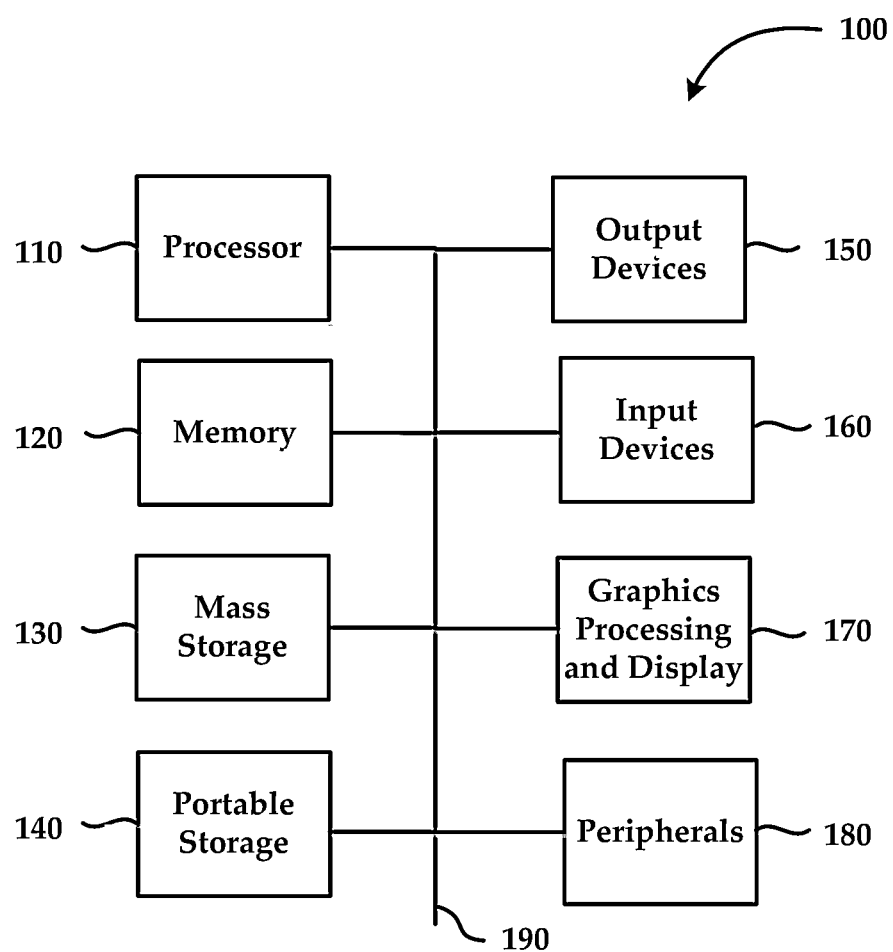
FIG. 1 illustrates an exemplary computing system that may be used to implement embodiments according to the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology may be directed to systems and methods for organizing and displaying data structures in computing devices. More specifically, but not by way of limitation, the present technology provides for graphical data display user interfaces (GUI) which are optimized for touch screen devices such as digital assistants, smartphones, tablets, and other mobile devices—just to name a few The present technology provides for a smooth multi-layer data navigation experience. These GUIs may be used for generic data tree displays, such as when representing hierarchical data structures. In some instances, the present technology may be integrated into the core operating system "O/S" user experience or any other application that is configured to represent data in GUI format.

Advantageously, the present technology may include features such as continuous shrinking of hierarchically organized frames to prevent cluttering of the GUI. In some instances, the shrinking may occur using logarithmic shrinking patterns of icons or other screen objects. It will be understood that the term "icon" as described herein may refer not only to the visual representation of an object in a graphical user interface, but may also refer to any visual representation of an object, such as an image, a video, a folder, a frame, a window, and any other visual object that would be known to one of ordinary skill in the art with the present disclosure before them.

The present technology may also include features such as continuous fading of color of parent frames or parent icons to prevent visual cluttering, as well as providing smooth "analogue" shifting (e.g., no "hard jumps" between views) that matches the relative location and velocity of the touch-based input received.

In some instances the present technology may also allow for pre-determined icon or frame "snapping" for optimal views according to the device screen size. The present technology may also provide for dynamic "morphing" of the layout of content in each field, to provide a smooth visual effect. These and other advantages of the present technology will be described in greater detail below with reference to the collective drawings, namely FIGS. 1-29.

FIG. 1 illustrates an exemplary computing system 100 that may be used to implement an embodiment of the present technology. The computing system 100 of FIG. 1 includes one or more processors 110 and main memory 120. Main memory 120 stores, in part, instructions and data for execution by processor 110. Main memory 120 can store the executable code when the computer system 100 is in operation. The computer system 100 of FIG. 1 may further include a mass storage device 130, portable storage device 140, output devices 150, input devices 160, a graphics processing and display 170, and other peripherals 180.

The components shown in FIG. 1 are depicted as being connected via a single bus 190. The components may be connected through one or more data transport means. Processor 110 and main memory 120 may be connected via a local microprocessor bus, and the mass storage device 130, peripherals 180, portable storage device 140, and graphics processing and display 170 may be connected via one or more input/output (I/O) buses.

Mass storage device 130, which may be implemented with a magnetic disk drive or an optical disk drive, is a non-volatile storage device for storing data and instructions for use by processor 110. Mass storage device 130 can store the system software for implementing embodiments of the present technology for purposes of loading that software into main memory 120.

Portable storage device 140 operates in conjunction with a portable non-volatile storage medium, such as a floppy disk, compact disk or digital video disc, to input and output data and code to and from the computing system 100 of FIG. 1. The system software for implementing embodiments of the present technology may be stored on such a portable medium and input to the computing system 100 via the portable storage device 140.

Input devices 160 provide a portion of a user interface. Input devices 160 may include an alphanumeric keypad, such as a keyboard, for inputting alphanumeric and other information, or a pointing device, such as a mouse, a trackball, stylus, or cursor direction keys. Additionally, the computer system 100 as shown in FIG. 1 includes output devices 150. Suitable output devices include speakers, printers, network interfaces, and monitors.

Graphics processing and display 170 may include a liquid crystal display (LCD) or other suitable display device. Graphics processing and display 170 receives textual and graphical information, and processes the information for output to the display device.

Peripherals 180 may include any type of computer support device to add additional functionality to the computing system. Peripherals 180 may include a modem or a router.

The components contained in the computing system 100 of FIG. 1 are those typically found in computing systems that may be suitable for use with embodiments of the present technology and are intended to represent a broad category of such computer components that are well known in the art. Thus, the computing system 100 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

According to some embodiments, the processor 110 may execute logic, which is encoded in one or more tangible media, such as main memory 120. The logic, when executed by the processor 110 may perform operations comprising generating a graphical user interface (GUI) that comprises at least one parent icon arranged into a primary frame according to a layout. Additionally, the processor 110 may execute the logic to perform an operation of receiving a selection of the at least one parent icon and an operation of transforming at least one parent icon into a secondary frame within the GUI and shrinking the at least one parent icon. In some instances, the processor 110 may execute the logic to perform an operation of populating the primary frame with at least one child icon which is linked to the at least one parent icon. It will be understood that the at least one child icon is larger in size compared to the at least one parent icon.

In accordance with the present disclosure, the processor 110 may execute the logic to perform operations such as generating a primary frame and generating a plurality of additional frames that are each progressively smaller in size relative to the primary frame. Additionally, the processor 110 may execute the logic to perform operations such as successively transitioning icons through the plurality of additional frames by shrinking and moving the icons into successively smaller frames.

The execution of logic by the processor 110 may include the processor 110 interacting with the graphics processing and display 170 of the computing system 100. In other instances, the graphics processing and display 170 of the computing system 100 may direct the organization and display of data via a layer of the Operating System used by the computing system 100. In general, the data organization and display methods described herein may be integrated into any application, program, client, system, or other product, device, or process that generates, either directly or indirectly, graphical user interfaces.

Figure 2:
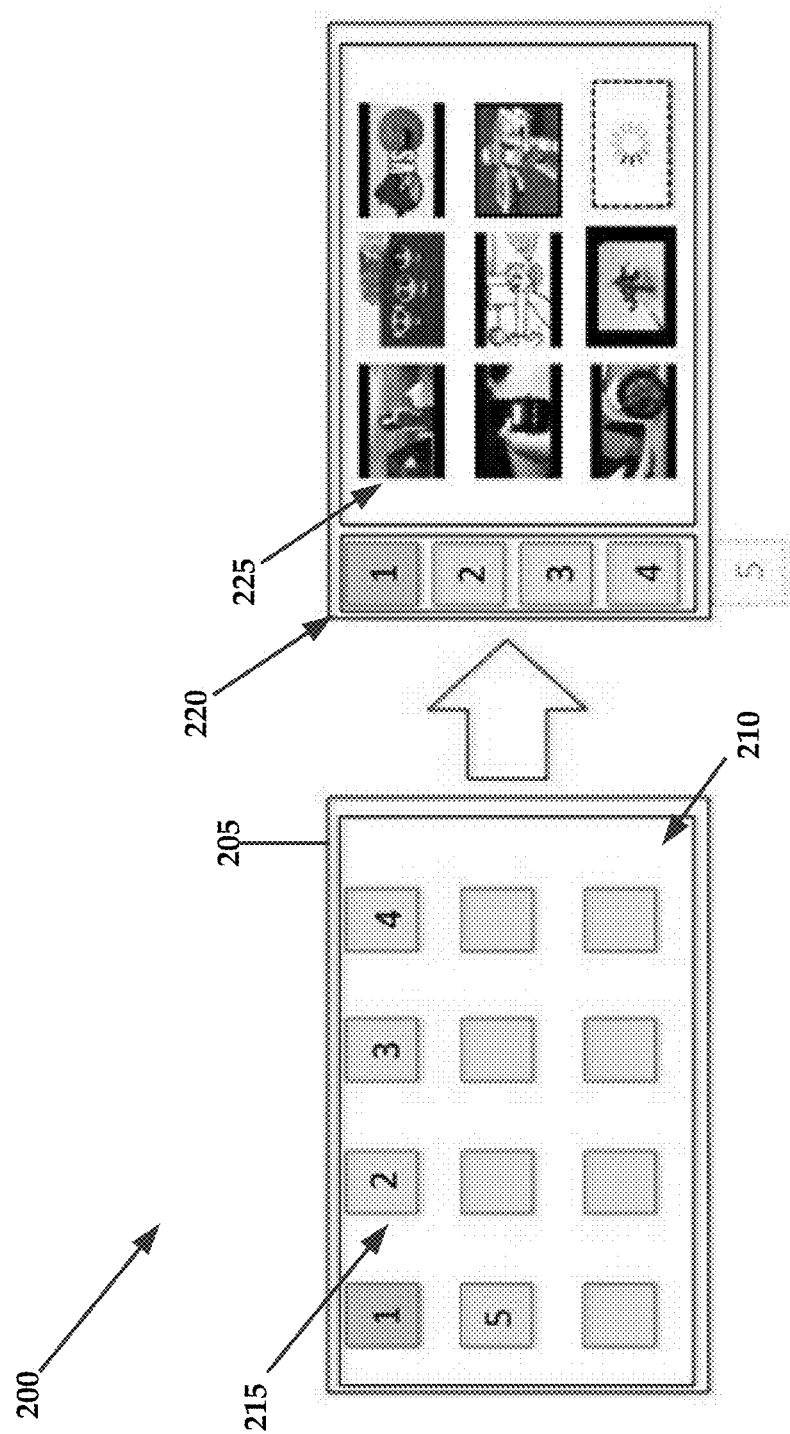
FIG. 2 illustrates exemplary GUIs that are generated in accordance with the present technology.

By way of non-limiting example, FIG. 2 illustrates exemplary GUIs that are generated in accordance with the present technology. For example, a first GUI 200 is shown as comprising a window 205 with a primary frame 210. The primary field of view is provided with a plurality of icons 215. Again, the icons may include visual representations of any type of object that can be visually represented in a graphical user interface. In this instance, the plurality of icons 215 include a plurality of folders that each include one or more video files. The plurality of icons 215 may be arranged in the primary frame 210 in any manner desired. In this example, the plurality of icons 215 are arranged in a grid-type layout.

The term "frame" as used herein may include not only a framed, outlined, or bordered grouping of icons/objects, but also a defined group of objects that are arranged according to a layout. Thus, a frame need not include a bounded area, but may include a segment or section of a GUI that may be bounded or unbounded by a border line.

Clicking or otherwise selecting of one of the plurality of icons 215 will cause rearrangement of the plurality of icons 215 from the grid layout to a vertically oriented (e.g., second) layout in a secondary frame 220. The plurality of icons 215 may be arranged in vertical hierarchical arrangement. The primary frame 210 may be reduced in size to accommodate for the secondary frame 220. Thus, the plurality of icons 215 may be scrolled through in hierarchical order. In this example, only four of the plurality of icons 215 are shown in the secondary frame 220, with the fifth icon being shown in phantom only (e.g. out of the visual field). Scrolling may reveal icons that are ranked above or below the presently displayed icons.

The secondary frame 220 is populated with child icons 225 that were hierarchically or otherwise associated with the selected one of the plurality of icons 215. For example, child icons 225 may include images of videos that were stored in a folder, such as folder "1" of the plurality of icons 215.

The sizing of the plurality of icons 215 relative to the child icons 225 allows for emphasis on the icons being displayed. That is, if the plurality of icons 215 are "parent" icons, the child icons 225 are "child" icons. The terms "child" and "parent" may represent an actual hierarchical relationship between two objects. In other instances, "child" and "parent" object may have only an indirect relationship relative to one another. Thus, while the two objects may be related to one another, the relationship need not be direct in order for the objects to be linked in a child/parent arrangement. For example, videos from two different "parent" folders may be included a secondary, tertiary, or higher frame.

When one parent selected from the plurality of icons 215 is chosen, the child icons 225 associated with the parent icon are displayed in the secondary frame 220. To place emphasis on the child icons 225 in the secondary frame 220, the child icons 225 may be larger in size relative to the parent icon to which the child icons 225 are related.

In some instances, the processor 110 may execute the logic to visually distinguish the parent icons in the secondary frame 220 from the child icons in the secondary frame 220. Visual distinguishing of parent and child icons may include, but is not limited to, modifying the color of the parent icons relative to the child icons, modifying the shape of the parent icons relative to the child icons, and modifying the transparency of the parent icons relative to the child icons—just to name a few.

In some instances, shrinking of icons or object includes reducing a size of at least one parent icon logarithmically. According to some embodiments, the processor 110 may execute the logic to reduce a visual distinctiveness of the at least one parent icon in the secondary frame compared to a visual distinctiveness of the at least one child icon.

The physical transformation between graphical user interfaces may be referred to as a "transformation" or "morphing" of content. The term "morphing" in the context of this inventions may refer to the dynamic and continuous rearrangement of layout of content (e.g., icons) displayed within the screen. Morphing provides a relatively smooth and spatially connected user experience, as opposed to disjointed and/or jarring switching of views. Morphing between GUIs may occur transparently to the end user, although in some instances the morphing may occur as a visual animation to the end user. Thus, the end user may see the rearrangement of icons from one layout to another and from one frame to another, and vice versa, as the end user navigates through the frames and objects.

Advantageously, the selected parent icon remains active and selectable even during the step of transforming. Thus, rather than generating static images of the objects on a screen and transitioning the images of the objects, the present technology transitions active, rather than passive, icons/objects. Thus, regardless of the current state of transition of an icon, it may be selected and activated.

According to some embodiments, the processor 110 may execute the logic to perform operations such as generating a graphical user interface (GUI) that comprises a frame that includes icons. In some instances, upon selection of an icon within the frame, the processor 110 may execute the logic to perform operations such as replacing the icons with replacement icons and resizing the replaced icons. Next, processor 110 may execute the logic to move the resized icons to a smaller frame within the GUI. It will be understood that if a smaller frame does not exist then the processor 110 may execute the logic to create a smaller frame for the resized icons and if a smaller frame exists but is occupied with previously resized icons then the previously resized icons are further resized and moved to a subsequently smaller frame.

Figure 3:
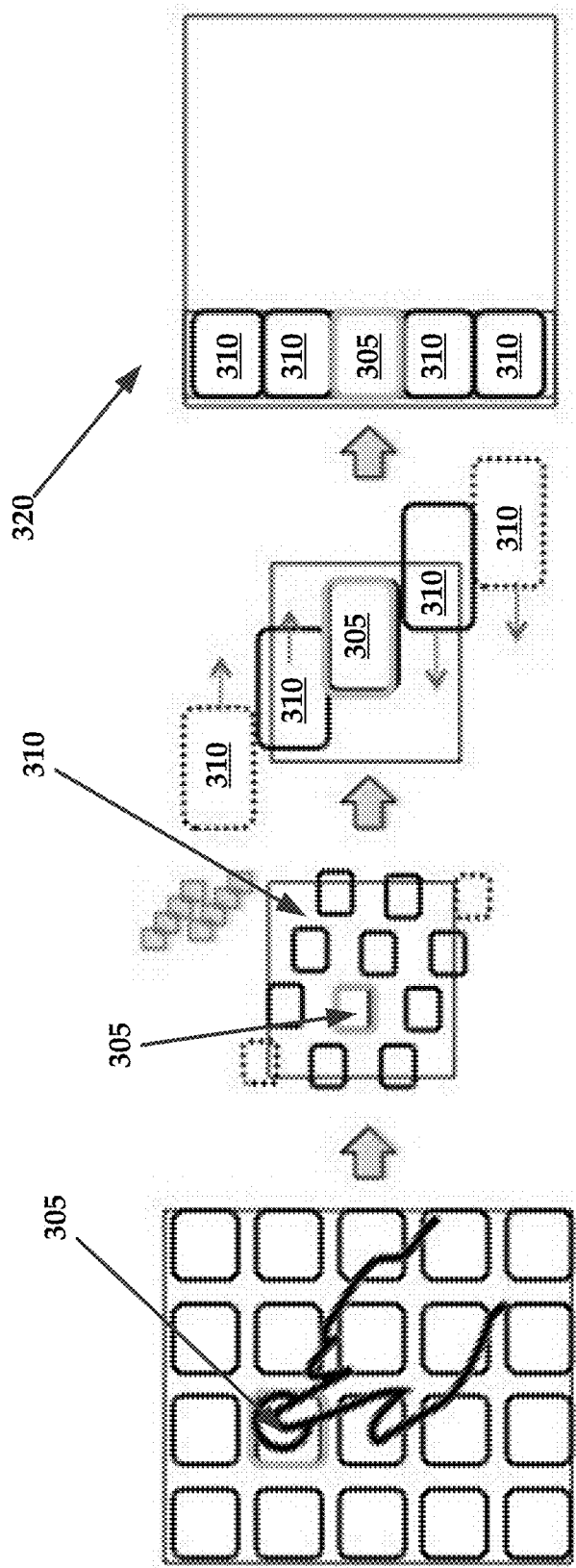
FIG. 3 illustrates the selection of an icon with subsequent arrangement of additional icons into a hierarchical format.

FIG. 3 illustrates the selection of an icon 305 with subsequent arrangement of additional icons 310 into a hierarchical format 315. For example, icons that are higher in rank and leftward of the selected icon 305 are transitioned rightward above the selected icon 305 and icons that are lower in rank and rightward of the selected icon 305 are transitioned leftward and below the selected icon 305.

The hierarchically rearranged icons may then be integrated into a frame of a GUI 320. In this instance, the selected icon 305 is placed at the vertical midline of the GUI 320.

Figure 4:
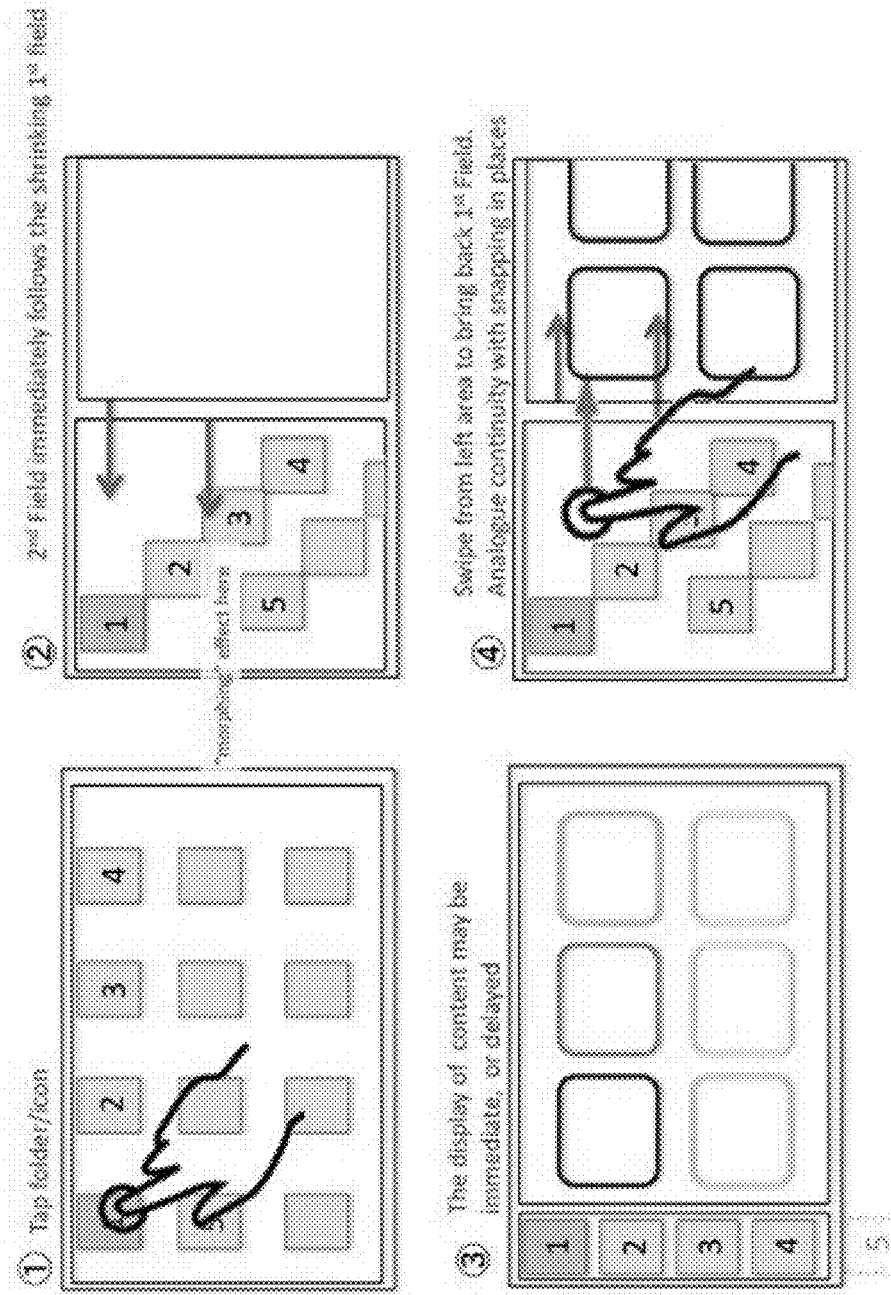
FIG. 4 illustrates an exemplary interaction sequence that allows for the rearrangement of icons.

FIG. 4 illustrates an exemplary interaction sequence that allows for the rearrangement of icons. In sequence (1), a primary frame includes a plurality of icons. One of the icons is selected by directing a touch-based input onto a touchscreen. That is, the end user may touch select an icon displayed in the primary frame. Sequence (2) illustrates the morphing of icons into a vertically hierarchical arrangement. Sequence (3) illustrates the vertical hierarchical group of icons placed into a secondary frame as well as a group of child icons, which have been placed into the primary frame. Again, it is noteworthy that the primary frame has been resized to accommodate for the inclusion of the secondary frame. Sequence (4) illustrates the reverse morphing that transitions from the GUI of sequence (3) to the GUI of sequence (1). More specifically, when an end user selects and swipes a parent icon in the secondary frame in a rightward motion across the primary frame, the parent icons are rearranged back into the primary view.

FIG. 5 illustrates an exemplary sequence (1)-(4) that shows how the present technology remembers a prior view. In this example, sequence (1) shows the transition of selecting a parent icon of the secondary frame and swiping to redisplay the parent icons of the secondary frame as primary icons in the primary frame. Also, the primary frame has been maximized.

Sequence (2) illustrates the initiation of a transition back to the previous frame shown in sequence (1). Without selecting an icon, the end user swipes leftward in free space of the primary frame to allow for the GUI of sequence (1) to be regenerated, as shown in sequence (3) of FIG. 4.

It will be understood that swiping leftward within the primary frame without selecting an icon may cause the GUI to morph back into the previous arrangement of the GUI and not just the GUIs shown. That is, free leftward swiping within the primary frame will cause the GUI to be rearranged into the previous GUI arrangement.

Figure 6:
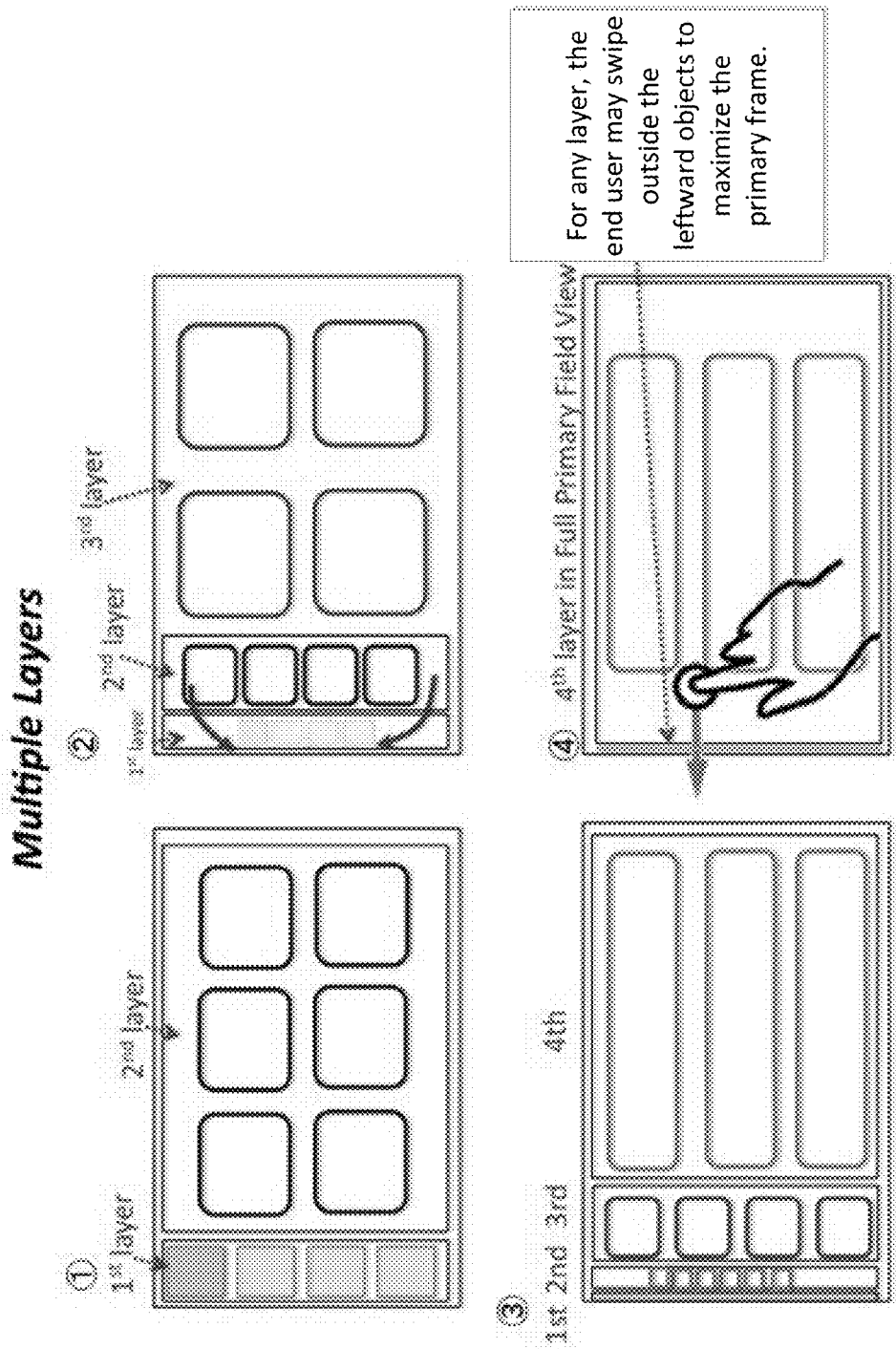
FIGS. 6 and 7 collectively illustrate various sequences that show the creation of an exemplary GUI with multiple "layers" or frames, as well as the logarithmic sizing of frames.
Figure 7:
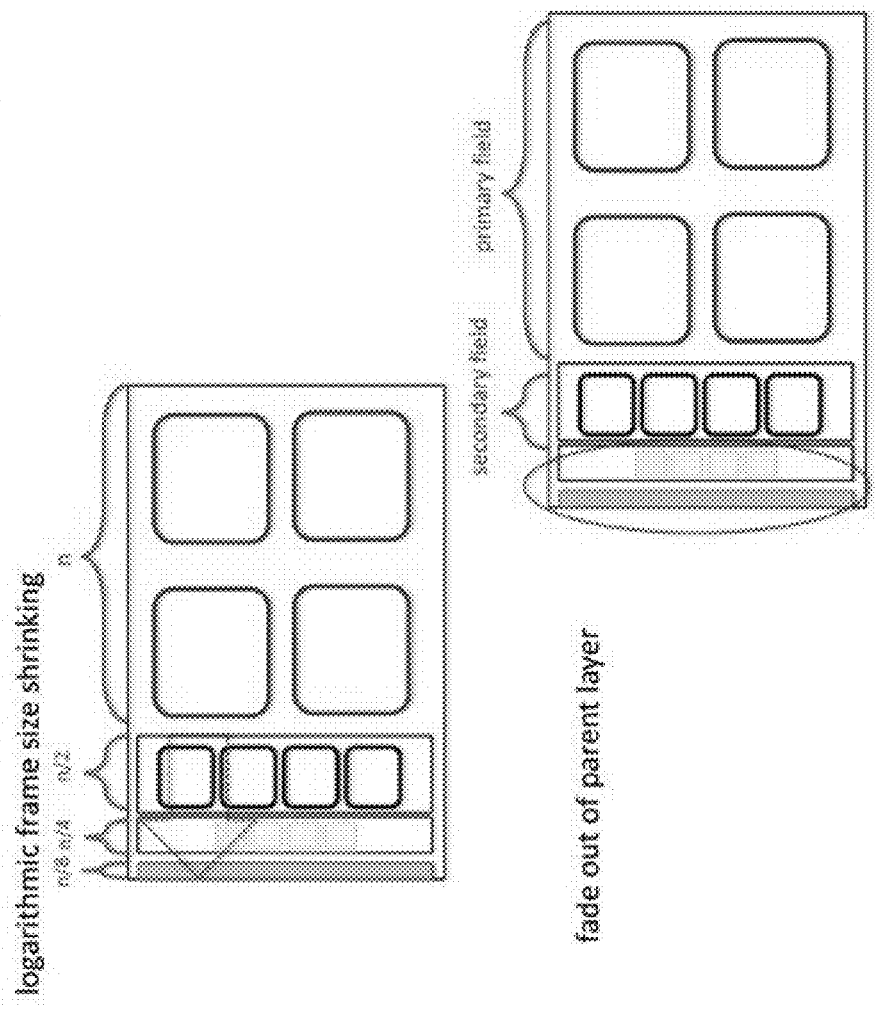

FIGS. 6 and 7 collectively illustrate various sequences (1)-(4) that show the creation of an exemplary GUI with multiple "layers" or frames. In this example, sequences (1) and (2) shows the creation of a tertiary frame in addition to the secondary frame and the primary frame. In general, selection of a child icon in the primary frame will cause morphing of the parent and child icons into the secondary and tertiary frames, while the child icons of the prior child icons are arranged into the primary frame according to a layout. Thus, the first layer (tertiary frame) corresponds to the original parent icons, the second layer (secondary frame) includes child icons of the original parent icons, and the third layer (primary frame) includes child icons of the child icons of the original parent icons.

According to some embodiments, the processor 110 may execute the logic to perform operations such as receiving a selection of at least one child icon and shrinking the at least one child icon. Additionally, the processor 110 may execute the logic to perform operations such as transforming the at least one child icon into the secondary frame and further shrinking the at least one parent icon.

Next, the processor 110 may execute the logic to perform operations such as generating a tertiary frame and transforming the at least one parent icon into the tertiary frame. Finally, the processor 110 may execute the logic to perform operations such as populating the primary frame with at least one tertiary icon which is linked to the selected child icon, the at least one tertiary icon being larger in size compared to the selected child icon included in the secondary frame, the child icon being larger in size compared to the parent icon included in the tertiary frame.

As shown in FIG. 7, the resizing of icons and frames corresponds to a logarithmic shrinking of frames. Additionally, the primary, secondary, and tertiary frames are progressively faded to reduce visual cluttering of frame and icons. While the use of logarithmic shrinking has been described, one of ordinary skill in the art will appreciate that other algorithmic shrinking schema such as Fibonacci (e.g., use of the golden ratio) shrinking may also likewise be utilized in accordance with the present technology.

Figure 8:
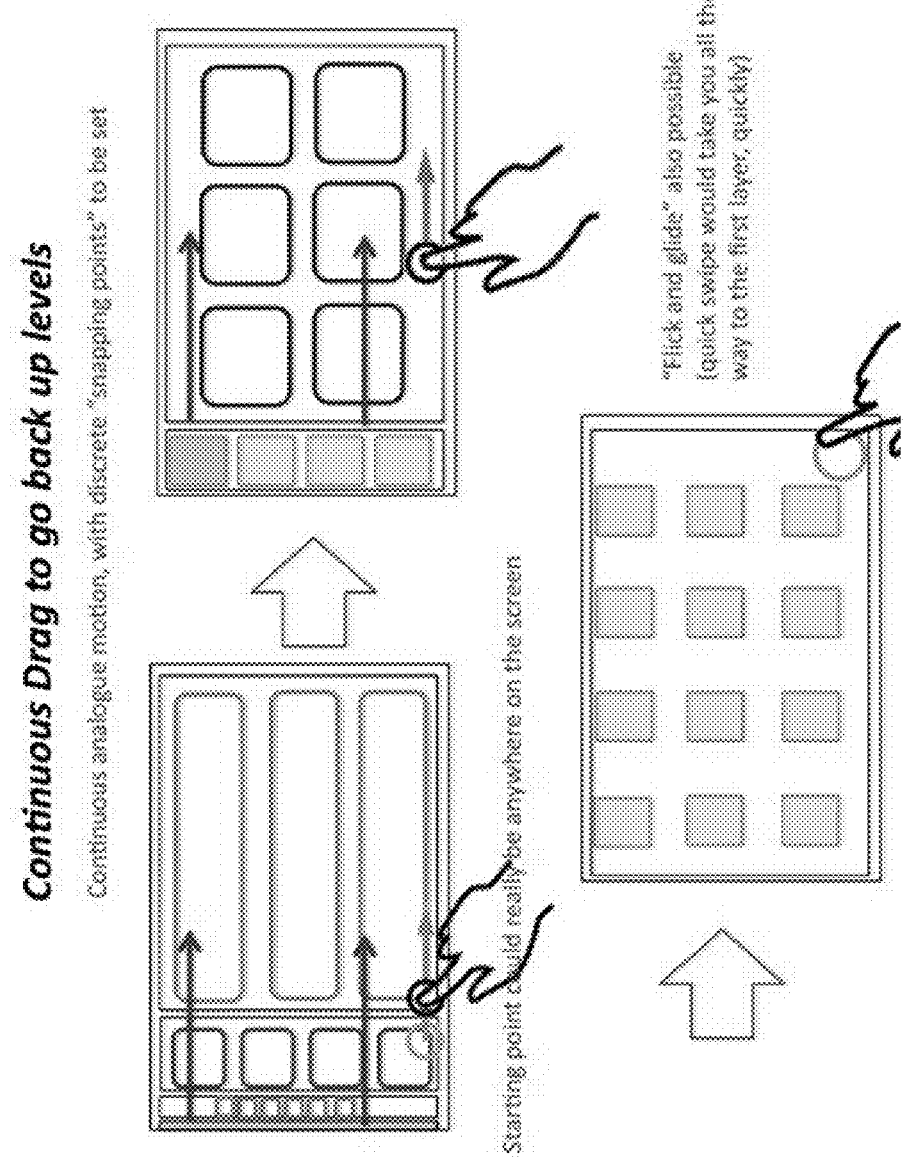
FIG. 8 illustrates various sequences that describe exemplary gestures or touchscreen inputs that allow for upward hierarchical transitioning between GUIs.

FIG. 8 illustrates various sequences that describe exemplary gestures or touchscreen inputs that allow for upward hierarchical transitioning between GUIs. In some instances, a continuous analogue motion, such as a touch and swipe, maybe used to direct the GUI upwardly one or more "levels" or layers. In some embodiments, a relatively quick swipe from the leftmost frame into the primary frame may allow for a transition of the icons in the leftmost frame into the primary frame, regardless of how many layers (e.g., frames) are present between the leftmost frame and the primary frame.

Figure 9:
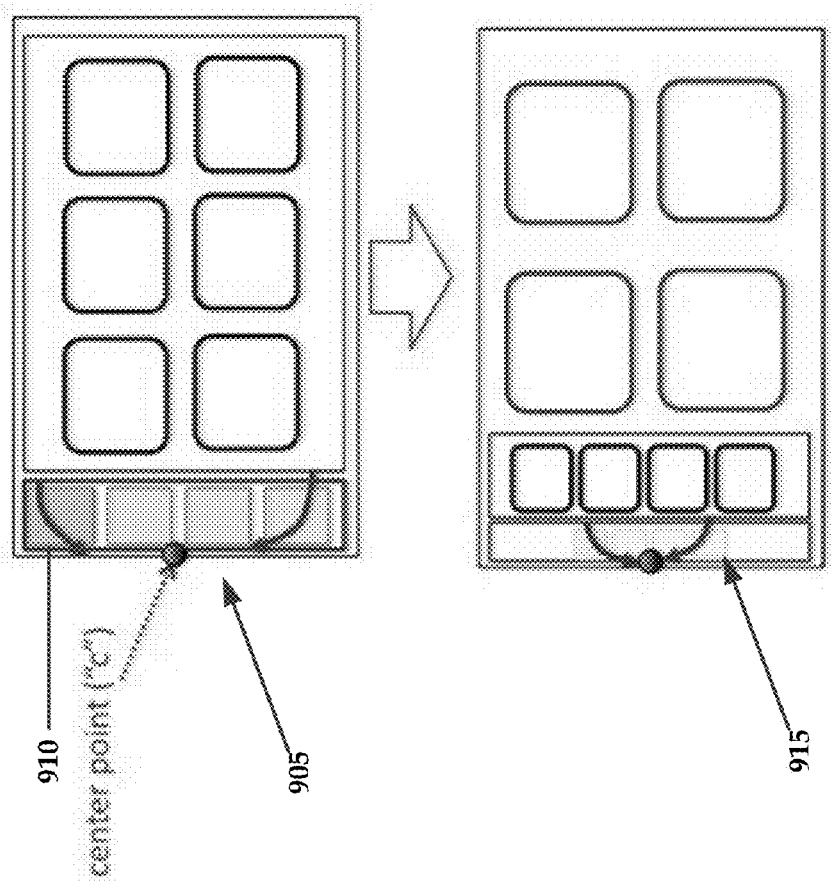
FIG. 9 illustrates the alignment of parent icons in a secondary frame to a center point associated with the secondary frame.

FIG. 9 illustrates the alignment of parent icons 905 in a secondary frame 910 to a center point C associated with the secondary frame 910. Again, a stepwise or logarithmic reduction of the parent icons 905 into a tertiary frame 915 is shown as converging or aligning with the center point C. In addition to the frame width shrinking by 50%, the folders (or parent icons 905) shrink proportionally, and also converge toward center point C to achieve the effect of vanishing towards a singular point.

Figure 10:
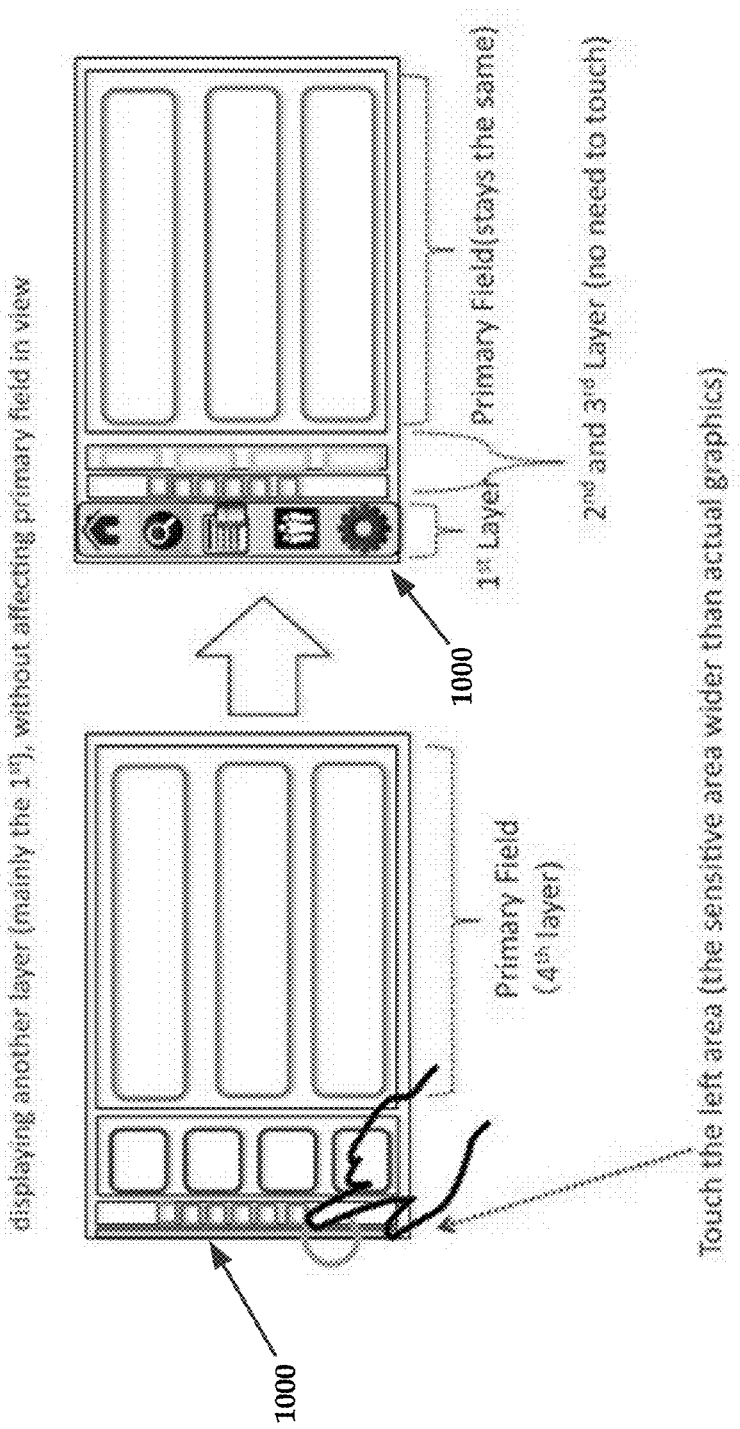
FIG. 10 illustrates the morphing of a GUI into a second GUI, which allows for the display of a fourth frame.

FIG. 10 illustrates the morphing of a GUI into a second GUI, which allows for the display of a fourth frame 1000. The fourth frame 1000 is small enough that the display of icons associated with the fourth frame is practically difficult. That is, the fourth frame is so small that icons included therein could not be visually distinguished or selected by the end user. To allow icons associated with the fourth frame 1000 (or other smaller frame) to be shown, the end user may select the fourth frame 1000, causing the second, third, and primary frames to compress. The compression of these additional frames makes room to enlarge (even temporarily) the fourth frame 1000.

Figure 11:
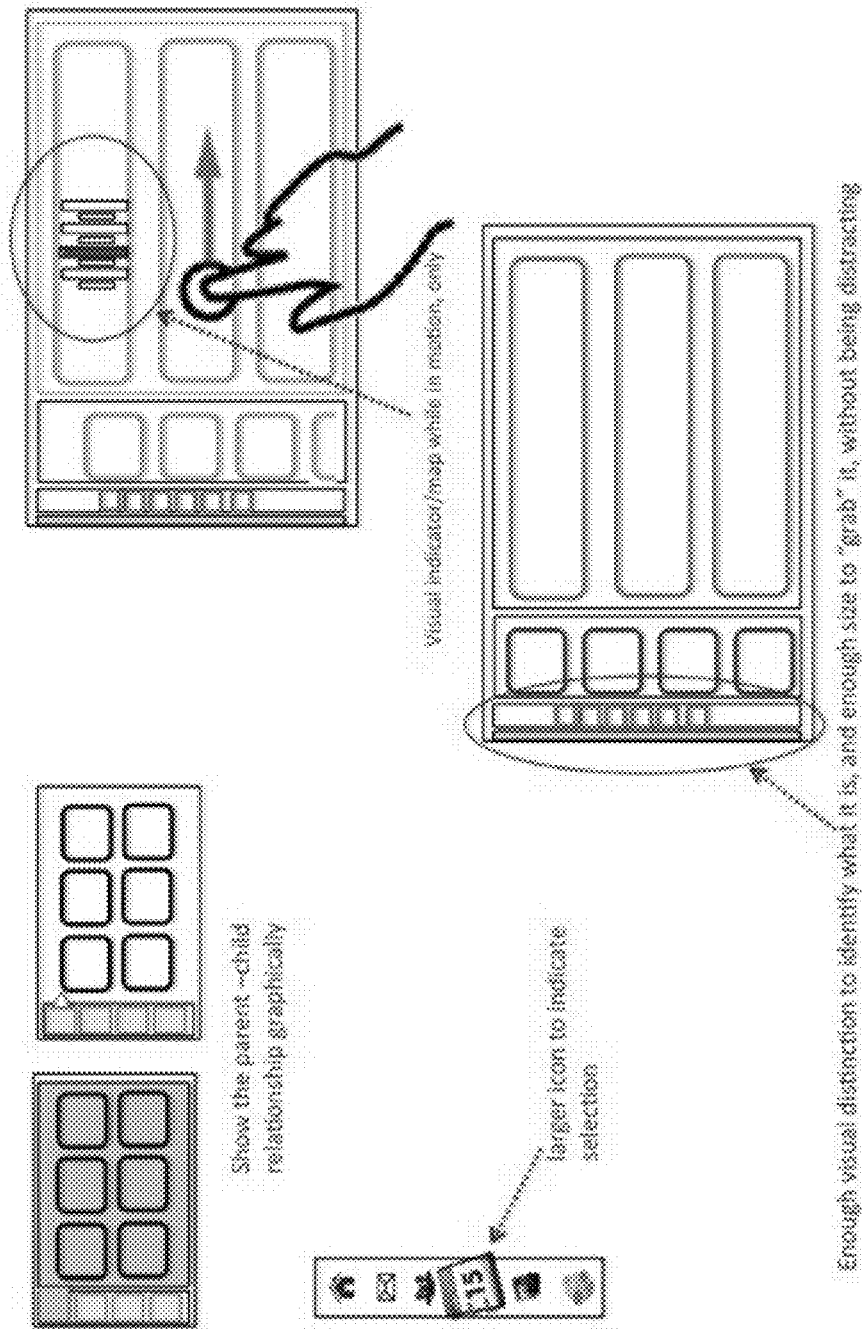
FIG. 11 illustrates various ancillary features of the present technology.

FIG. 11 illustrates various ancillary features of the present technology. For example, currently selected icons may be enlarged or animated, for example, the selected icon may blink. A selected parent icon may be visually distinguished in the second frame to indicate that the child icons in the primary frame are associated with the parent icon. In other embodiments, certain objects, such as graphs or images may be displayed while an icon is in motion.

Figure 12:
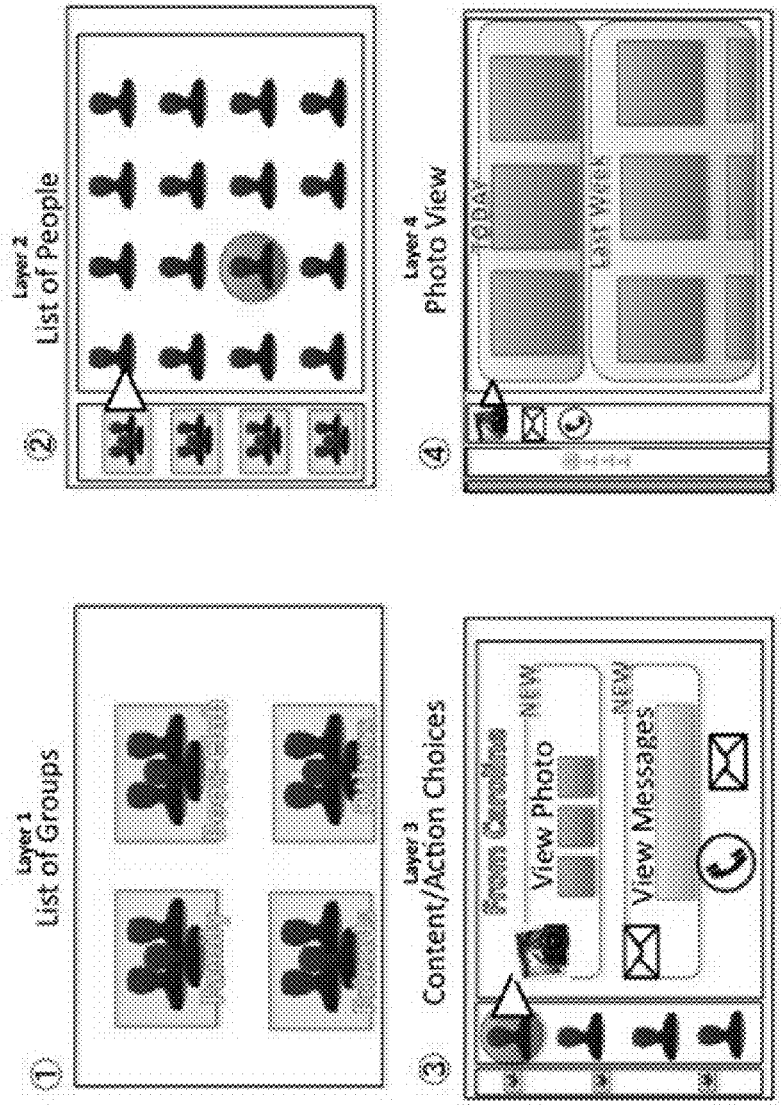
FIGS. 12 and 13 collectively illustrate exemplary use cases for the present technology.
Figure 13:
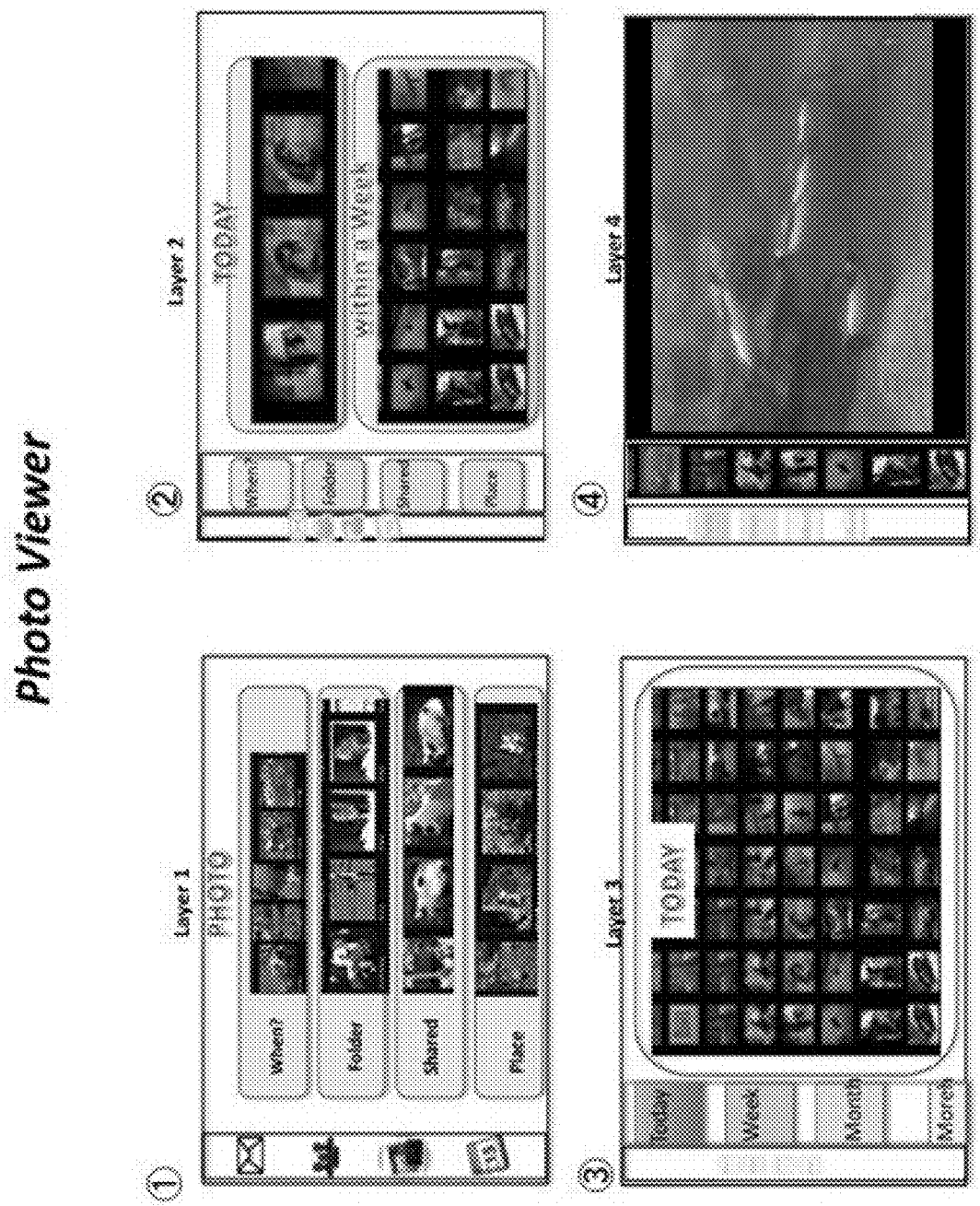

FIG. 12 illustrates an exemplary use case for the present technology. In sequence (1) a list of photograph groups is shown in a primary frame. Sequence (2) is a GUI that includes a secondary frame that includes parent icons that were originally displayed in the primary frame of sequence (1). Again, these parent icons have been arranged in a second layout, such as a vertical list. Child icons associated with a selected parent icon are loaded into the primary frame and arranged in a particular layout. These child icons may represent photographs associated with a particular individual. Sequence (3) illustrates the logarithmic resizing of frame and icons. More specifically, a tertiary frame is created leftward of the secondary frame, which is also leftward of the primary frame. Again, the primary and secondary frames are reduced in size compared to the primary and secondary frames of the GUI of sequence (2), which allows for the placement of the tertiary frame. Similarly, in sequence (4) a fourth frame is created leftward of the tertiary frame. As mentioned before, as additional frames are created, icons are sequentially moved leftward such that the original parent icons that were present in the primary frame (see sequence (1)) are always in the leftmost frame. FIG. 13 illustrates another exemplary use case for the present technology, showing GUIs generated by a photo viewer application or service.

Figure 14:
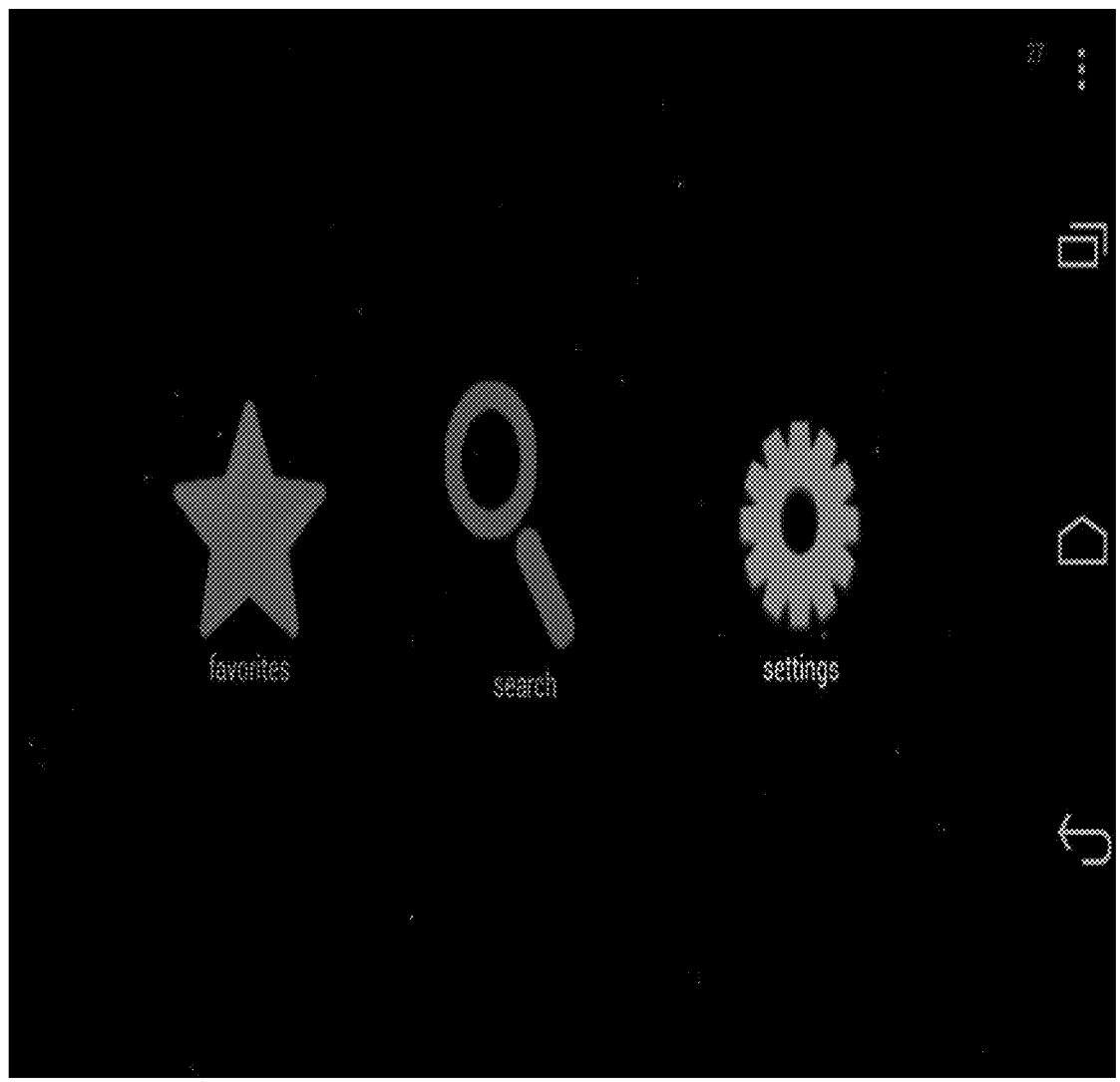
FIGS. 14-16 collectively illustrate exemplary GUIs that represent an active desktop.
Figure 15:
Figure 16:
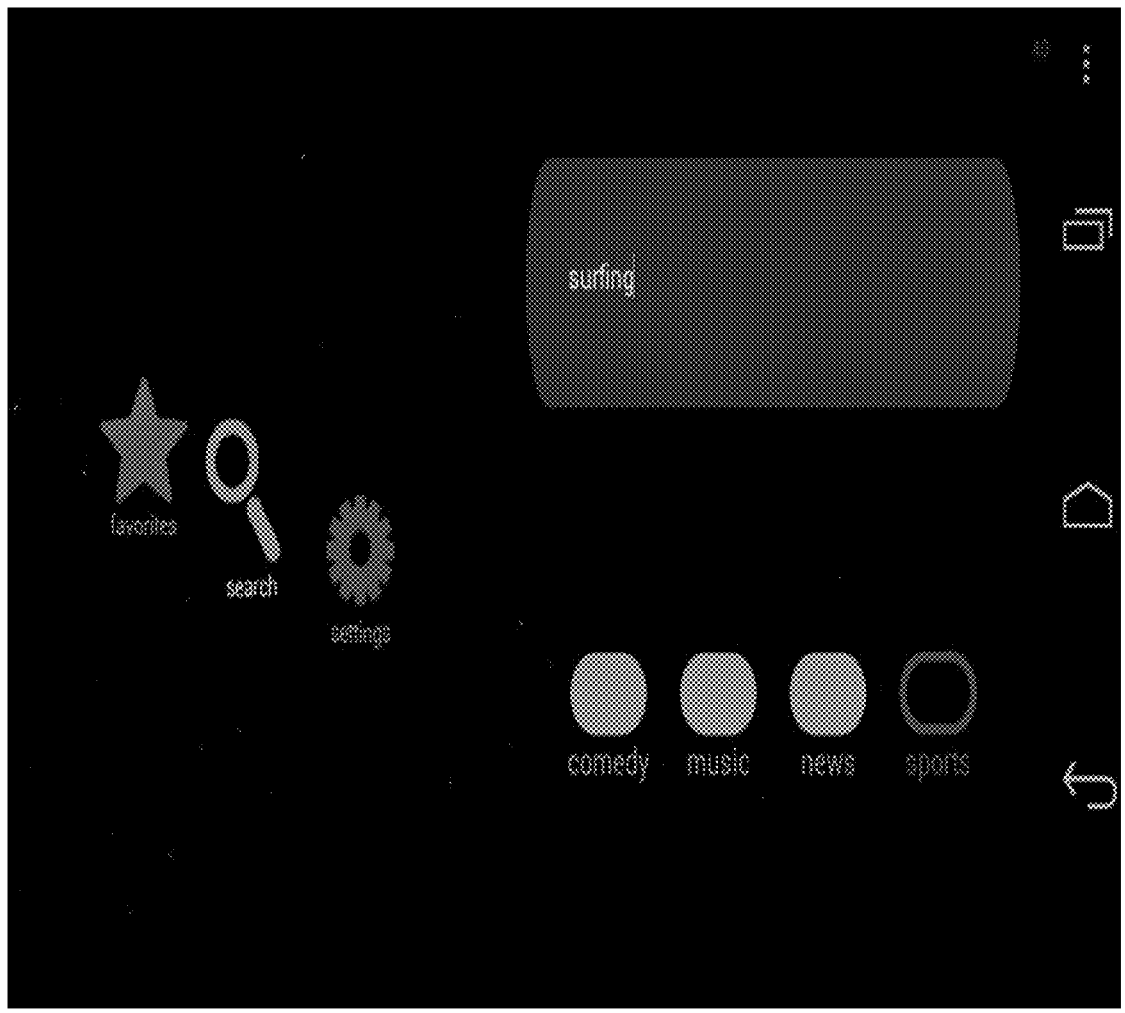

FIGS. 14-16 collectively illustrate exemplary GUIs that represent an active desktop. General icons are shown in a horizontally oriented list. These general icons include Favorites, Search, and Settings. The general icons are placed into a primary frame which is maximized in the GUI. Various static features are shown along the right side of the GUI and are located in a static frame.

FIG. 15 illustrates rearrangement of the general icons after selection of the Surfing icon in the primary frame of FIG. 14. The general icons are rearranged into a vertical listing in a secondary frame. Icons representing sub-categories associated with the Search general icon are arranged into the primary frame, along with a search bar.

Figure 17:
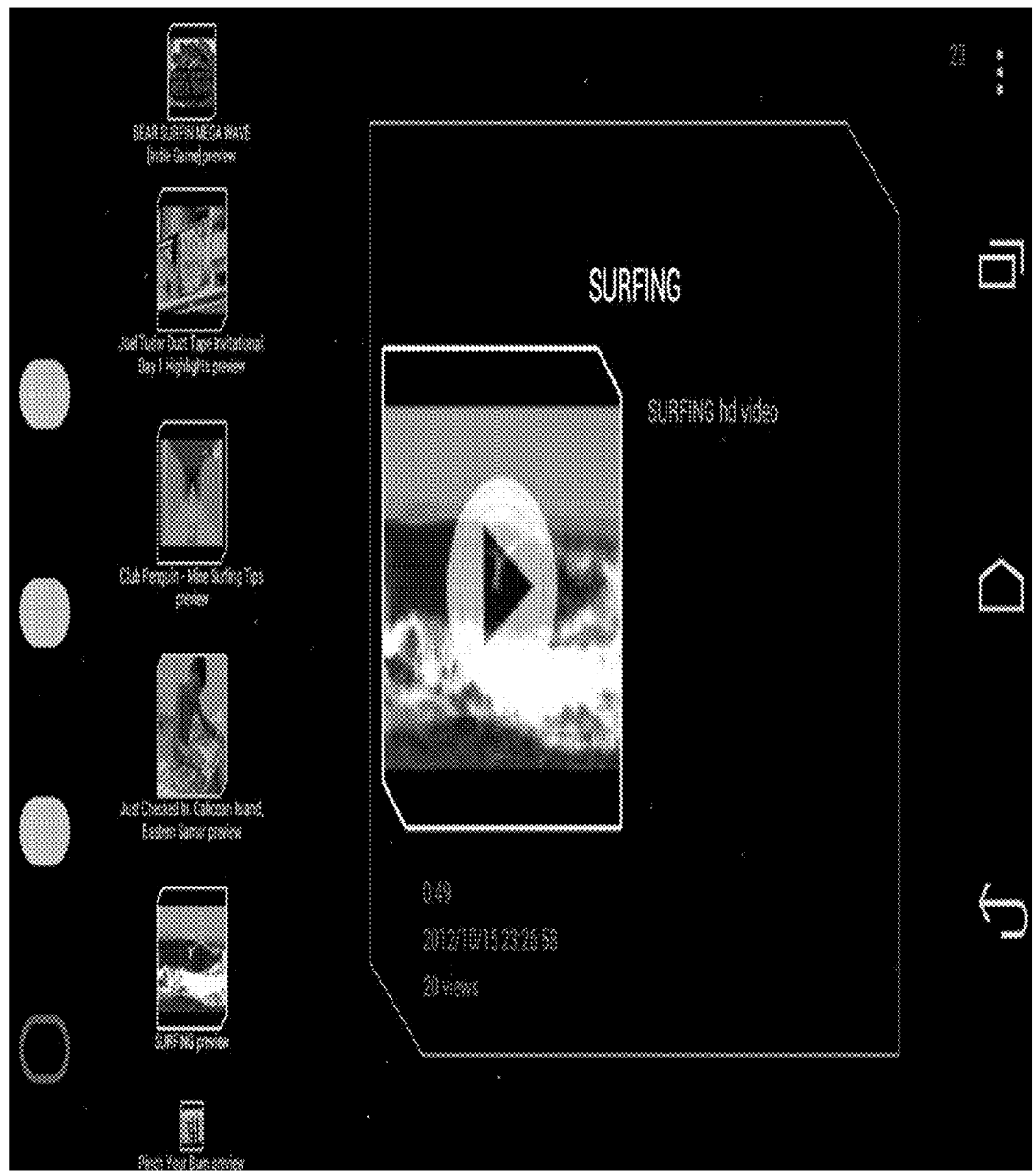
FIGS. 17-19 collectively illustrate additional exemplary GUIs that represent an active desktop.
Figure 18:
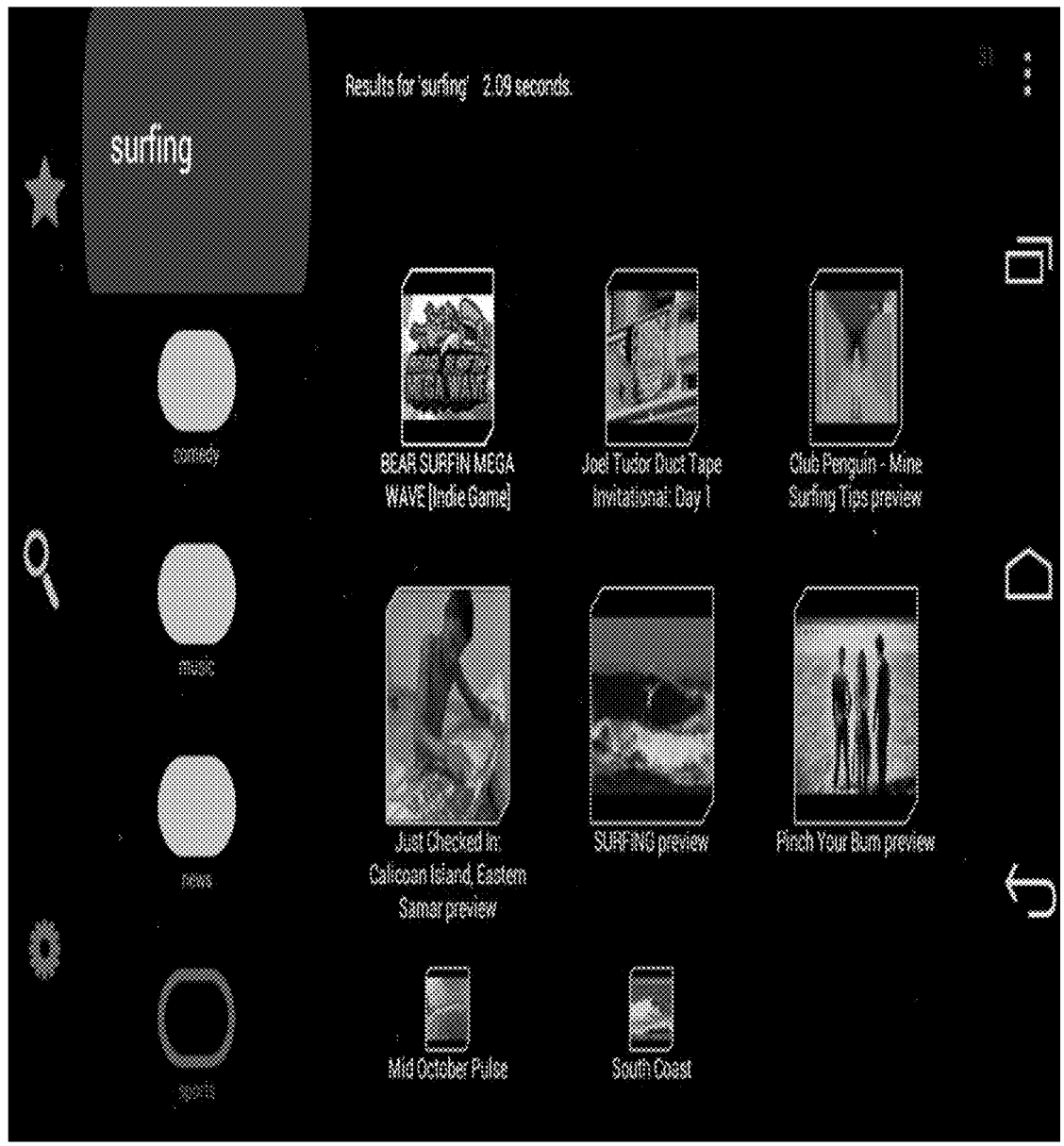
Figure 19:
Figure 20:
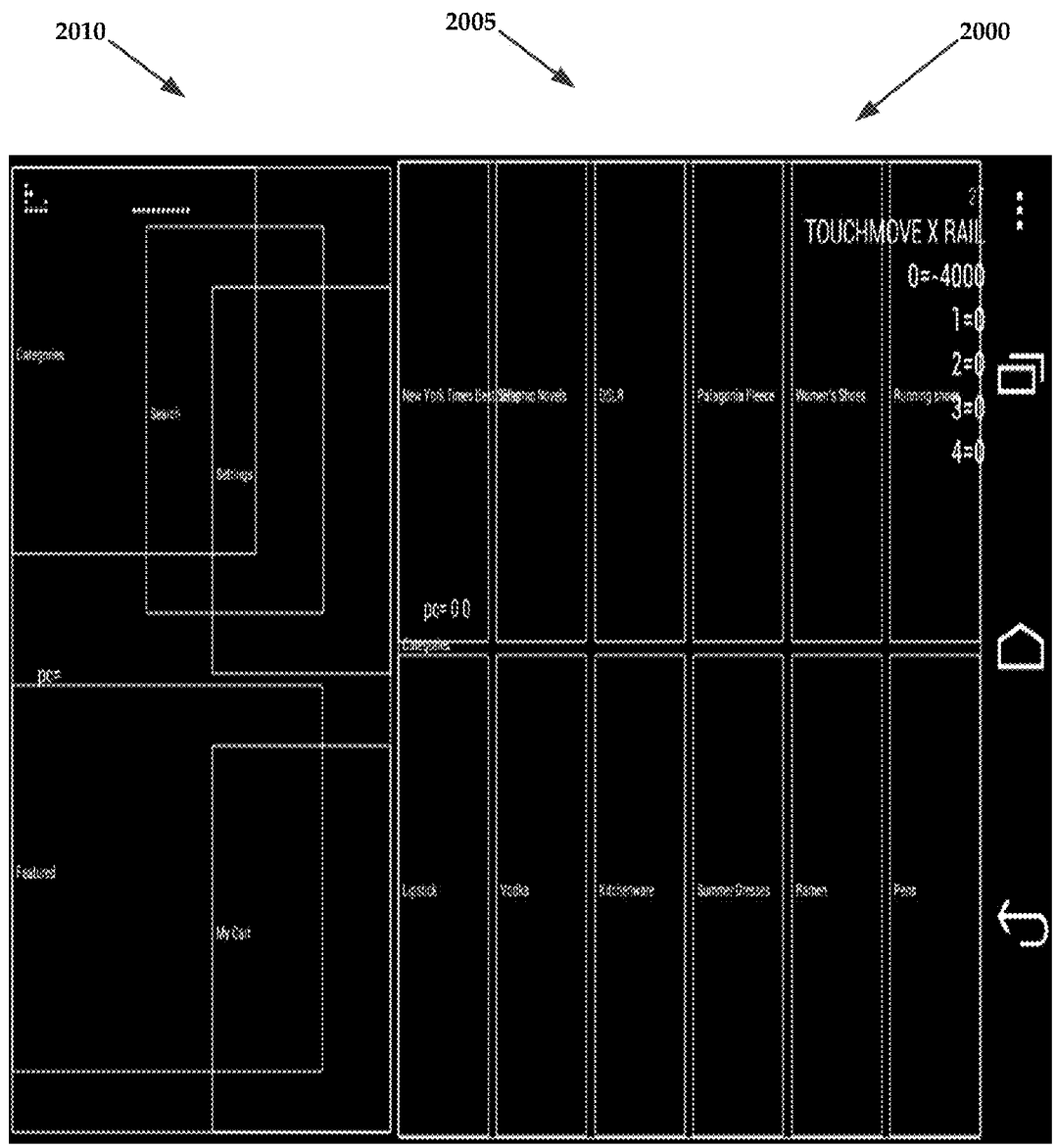
FIGS. 20-24 collectively illustrate schematic mockups of exemplary frames that subdivide a GUI into primary, secondary, and tertiary frames.
Figure 21:
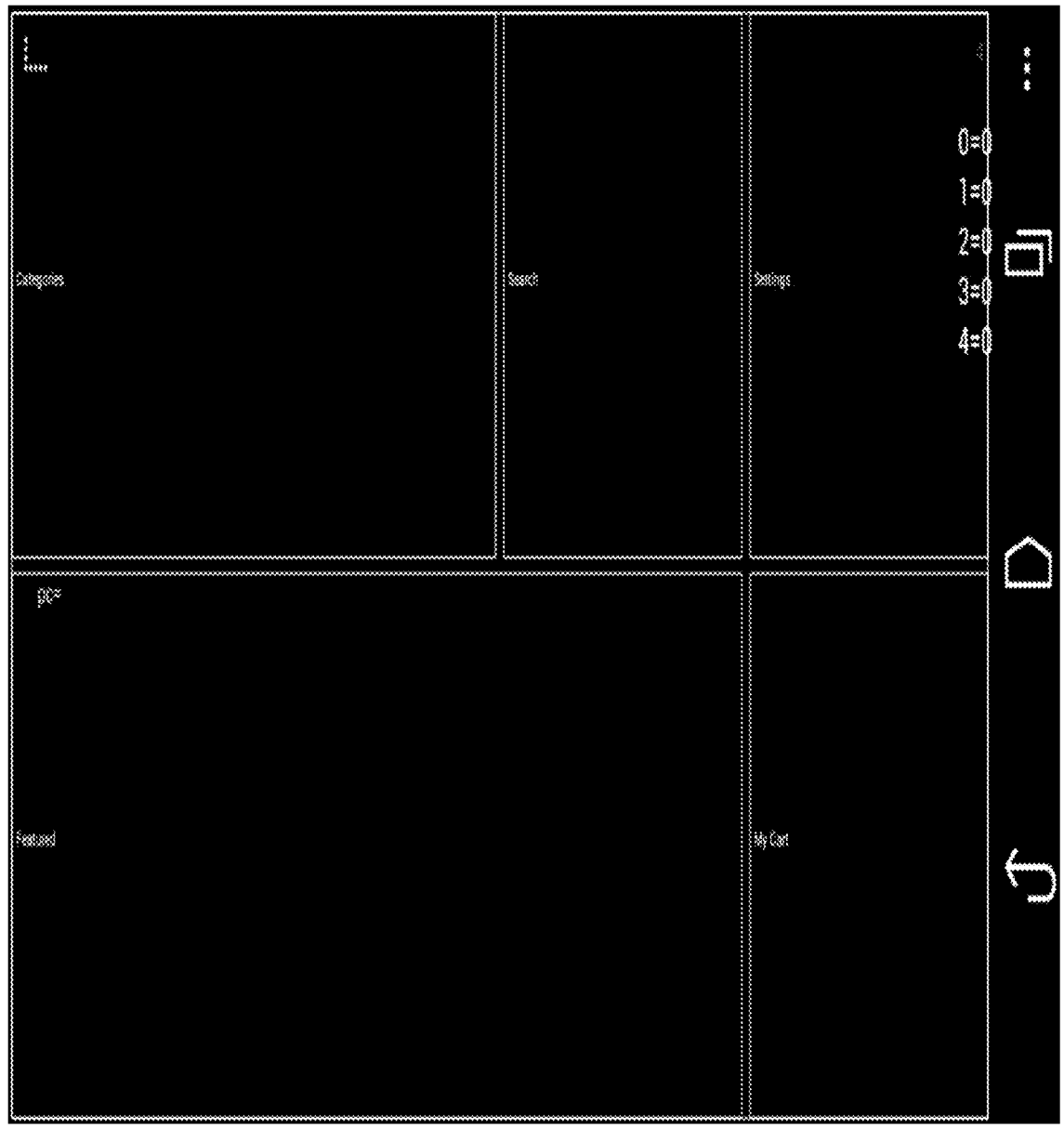
Figure 22:
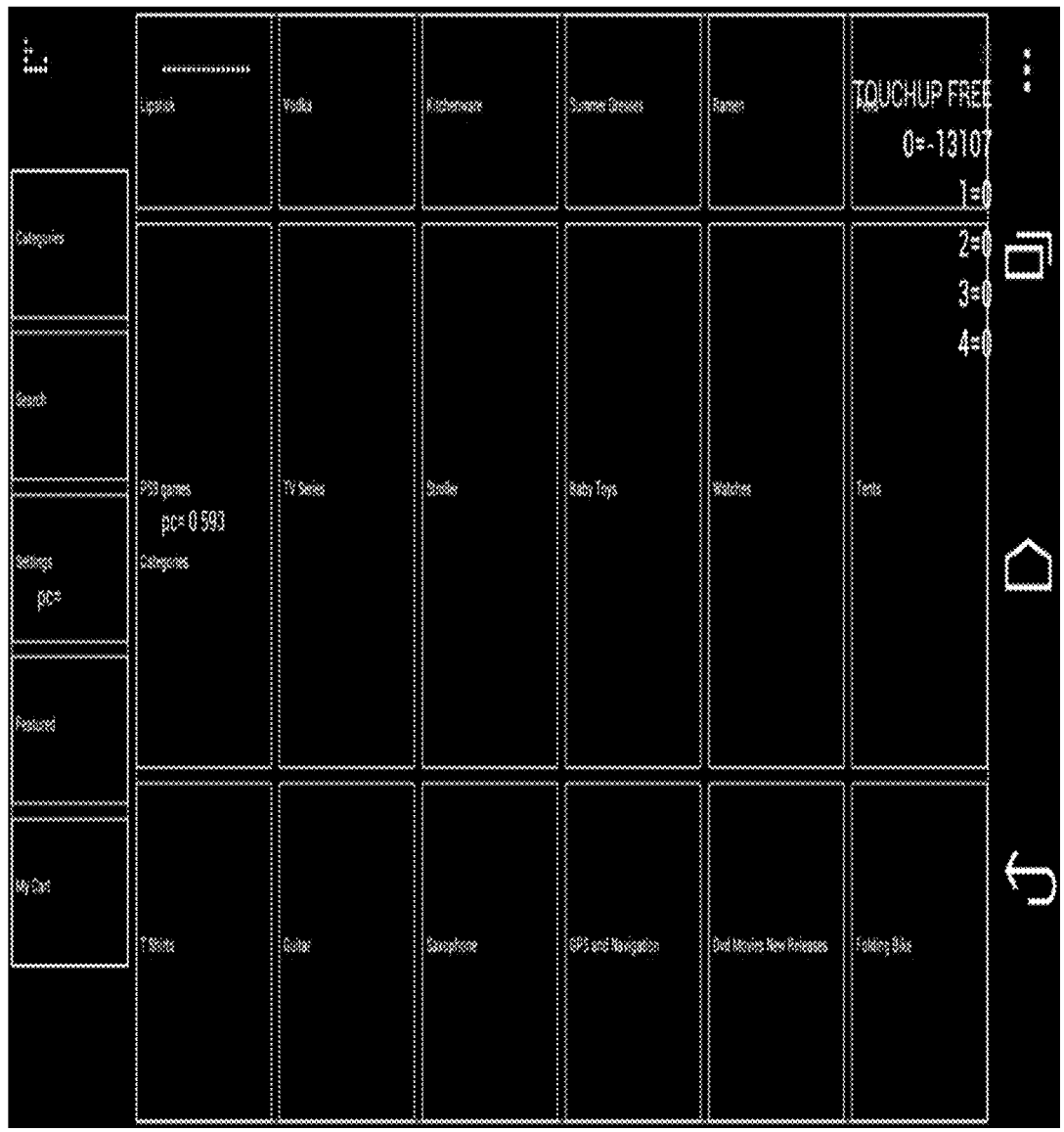
Figure 23:
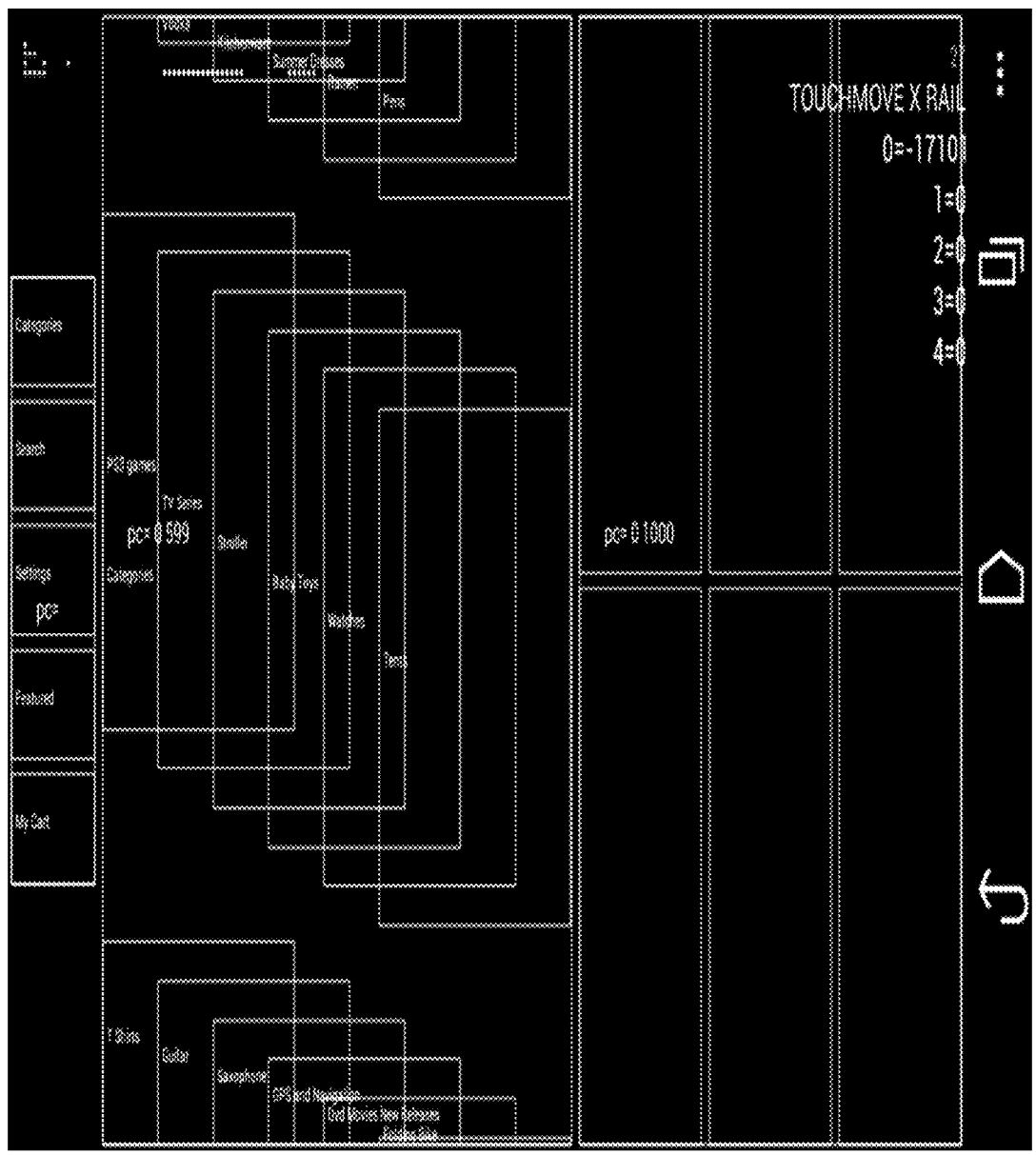
Figure 24:
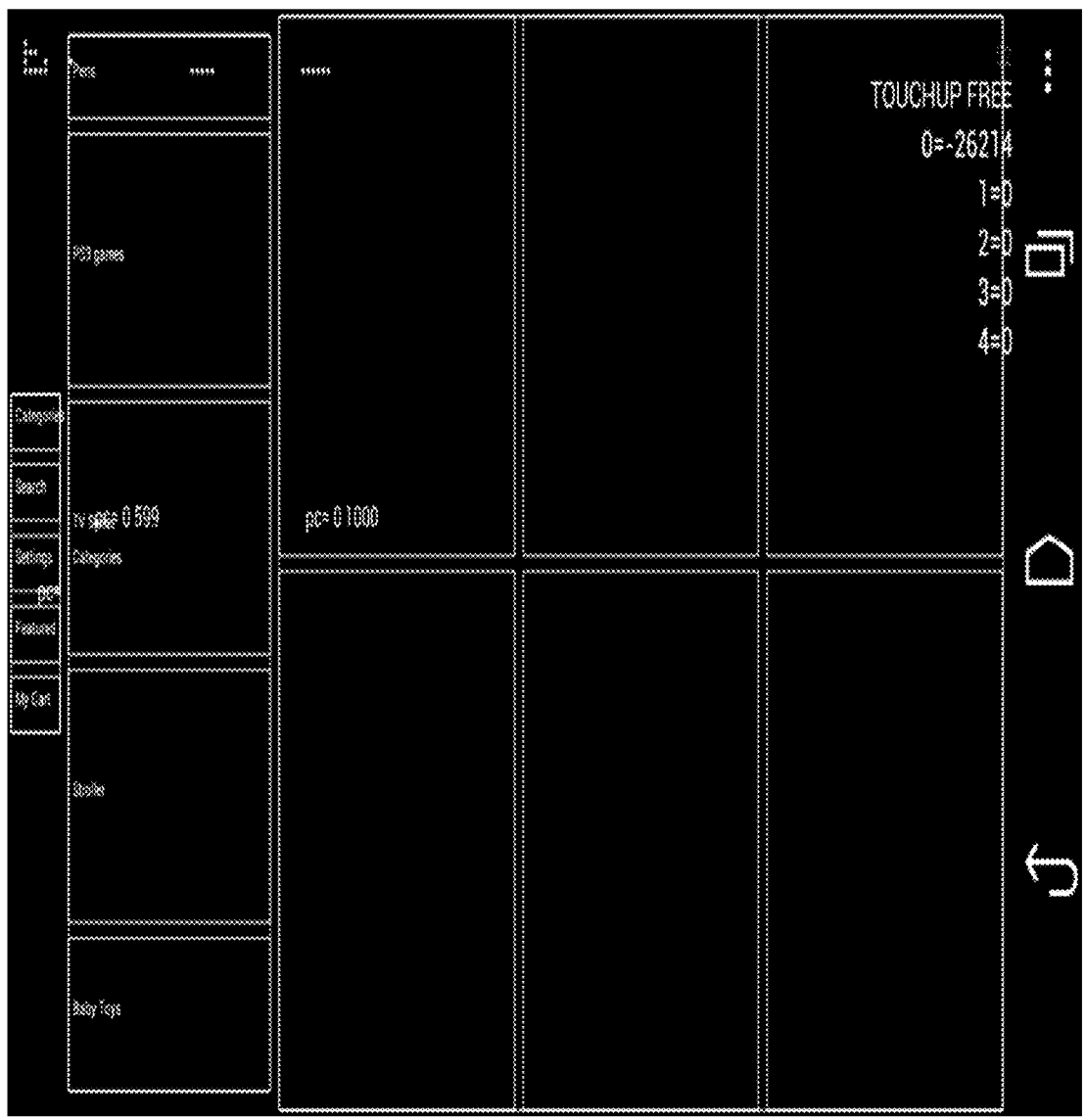
Figure 25:
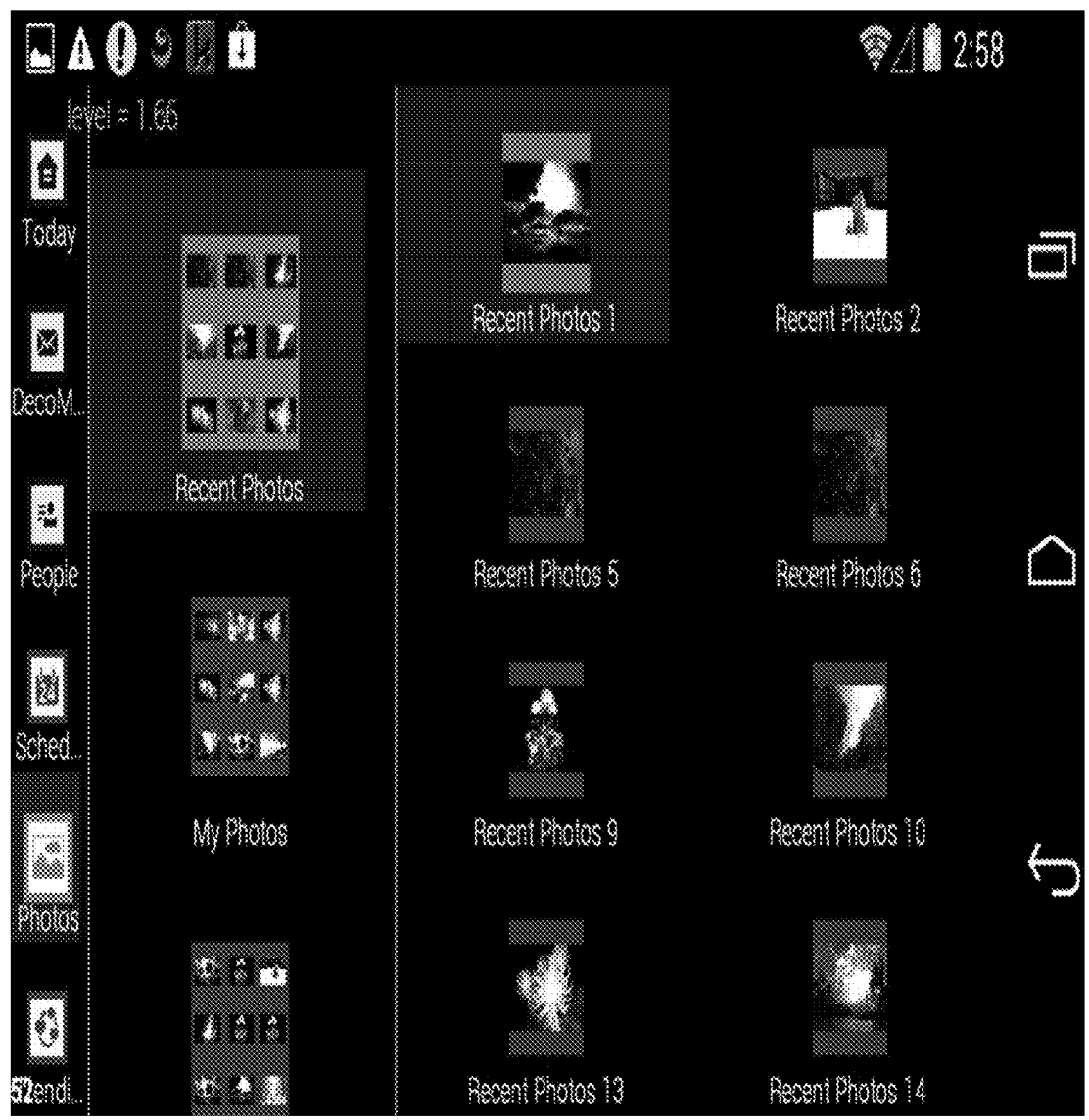
FIGS. 25-29 collectively illustrate various GUIs that display data on a computing device.
Figure 26:
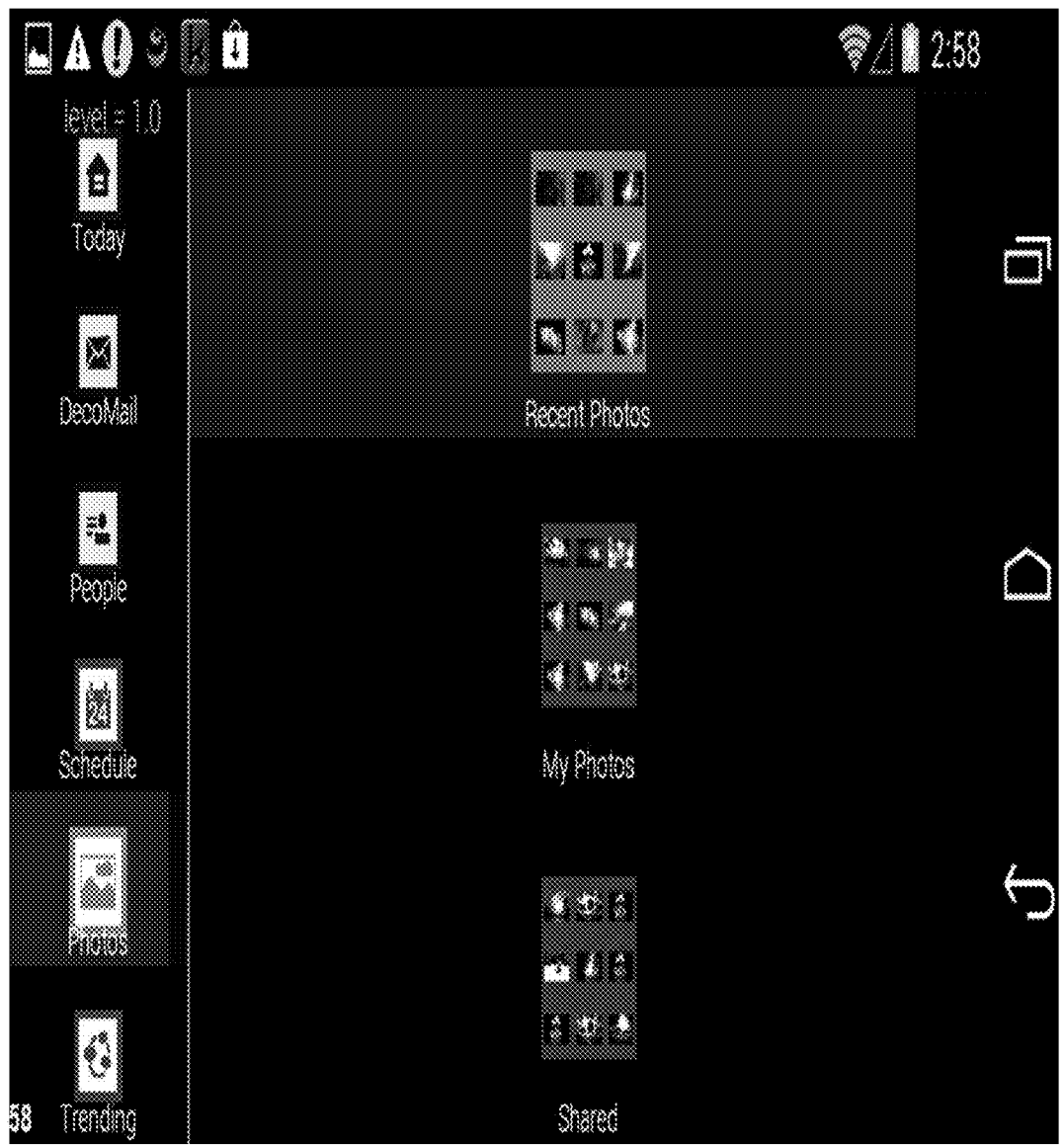
Figure 27:
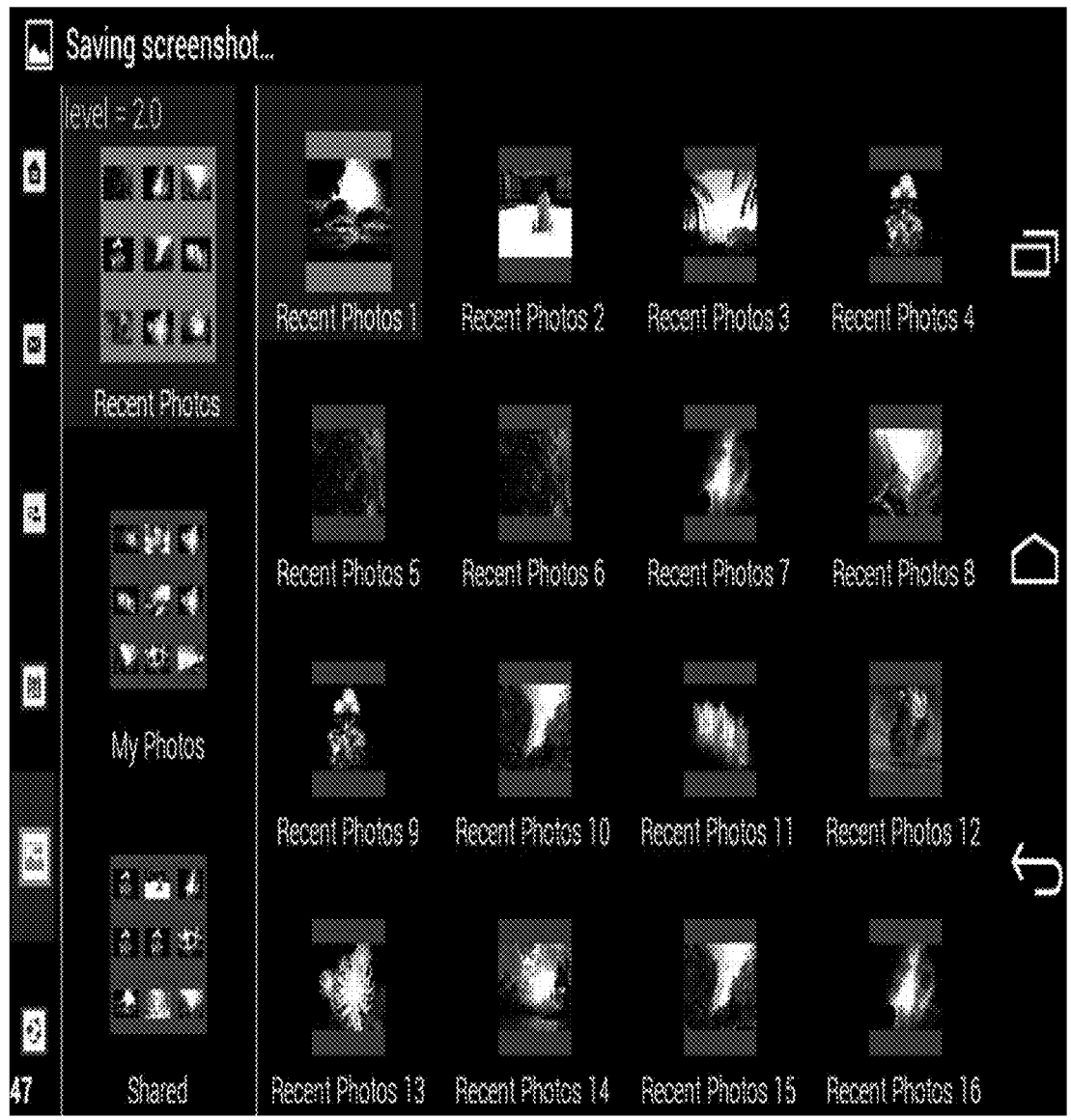
Figure 28:
Figure 29:

FIG. 16 illustrates an alternative rearrangement of the general icons after selection of the Surfing icon in the primary frame of FIG. 14. The general icons are arranged in a diagonally aligned list in a secondary frame, while child nodes icons representing sub-categories associated with the Search general icon are arranged into the primary frame, along with a search bar. In this embodiment, the secondary and primary frames are substantially equal in size to one another. FIGS. 17-19 collectively illustrate exemplary GUIs that represent an active desktop.

FIGS. 20-24 collectively illustrate schematic mockups of exemplary frames that subdivide a GUI into primary, secondary, and tertiary frames. Each of the frames is shown as being further subdivided into sections. For example, a primary frame 2000 can be subdivided into a plurality of sections 2005. Sections may be arranged into a grid format, or may be arranged in an overlapping or tiled relationship relative to one another (see section 2010). One of ordinary skill in the art will appreciate that many arrangements of frames and sections may likewise be utilized in accordance with the present technology.

FIGS. 25-29 collectively illustrate various GUIs that display data on a computing device. In these examples, photographs may be displayed by successively opening folders and/or groups of photographs. An image may ultimately be selected from a folder and displayed in a primary frame.

Advantageously, the present technology may allow for the use of input via not only touch input but also via a number of other input methods including, but not limited to sound-based input, motion-based input, IR or RF controller-based inputs, or any other suitable input method or device that would be known to one of ordinary skill in the art.

Additionally, while many of the examples described above contemplate the use of GUIs with frames ranging from a primary frame to GUIs with primary, secondary, tertiary, and fourth frames, the present technology may be utilized to generate GUIs with any number of frames.

FIG. 30 illustrates a GUI 3000 that comprises a scrollable arrangement of a first plurality of selectable objects 3005. The first plurality of selectable objects 3005 are arrange into a first layout, which in this example includes a vertically aligned and scrollable configuration of objects. As the user scrolls upwardly or downwardly, selectable objects scroll through the display area 3015. The display area 3015 may also be referred to as the primary display of the GUI because the object(s) placed within this area are within the primary viewing space of the GUI and highly visible to the end user.

The first plurality of selectable objects 3005 may scroll through the display area in an infinite loop. Alternatively, the selectable objects may have a defined beginning object and ending object, such that when either of these objects is reached, the list of objects cannot be further scrolled.

Selection of one of these selectable objects by the user via a click or tap action causes the first plurality of selectable objects 3005 in the display area 3015 to be replaced with a second plurality of selectable objects 3020 that are arranged in a second layout on the GUI, as is illustrated in FIG. 31.

In some instances the second layout for the second plurality of selectable objects 3020 comprises a different visual appearance from the first layout. For example, the first layout of FIG. 30 includes rectangular shaped objects that are similar in size and shape to one another. The second layout of the second plurality of selectable objects 3020 in FIG. 31 are of different size and shape relative to the first layout.

Additionally, selection of one of the first plurality of selectable objects 3005 causes a transformation of the first plurality of selectable objects 3005 into a first set of icons 3025 that are arranged in an arcuate pattern. To ensure that the first layer is still visible, the first set of icons is transformed into shrunken (reduced size) versions of the first plurality of selectable objects. An "icon" is a smaller version of a selectable object. The icon is also selectable and may include a simplified visual representation of the selectable object. For example, if the first plurality of selectable objects 3005 includes an image, the first set of icons may be a shrunken version of the same image, or a cropped version of the images.

As with the second plurality of selectable objects 3020, the first set of icons 3025 are selectable. That is, the second plurality of selectable objects 3020 remain active and selectable at the same time the first set of icons 3025 are selectable.

According to some embodiments, the first set of icons 3025 include an arrangement of selectable objects that are positioned in an arcuate pattern around a corner 3030 of the GUI. Also, the first set of icons 3025 include a different shape and size than the shape and size of the first plurality of selectable objects 3005 of the first layer of FIG. 30. For example, each of the first set of selectable objects are circular in shape and smaller in size relative to the first plurality of selectable objects 3005 of the first layer of FIG. 30.

The user may also scroll through the first set of icons 3025. Scrolling of the first set of icons 3025 by a user causes the icons to rotate around the corner 3030 of the GUI 3000. In some embodiments, scrolling of the first set of icons 3025 causes scrolling of the selectable objects in the display area 3015. This may be useful when the object displayed in the display area 3015 is an enlargement of a selected icon.

The corner around which the first set of icons 3025 is anchored may be determined by an end user. For example, the end user may select one of the first plurality of selectable objects 3005. The user may drag the selected object to a desired corner. Remaining objects from the first plurality of selectable objects 3005 are arranged into an arcuate configuration around the specified corner.

According to some embodiments, transformation of the first plurality of selectable objects 3005 into a first set of icons that are arranged in an arcuate pattern is based upon a categorization for the first plurality of selectable objects or a categorization of the second plurality selectable objects. It will be understood that a categorization may relate to a subject matter or a content type. For example, a user may specify that news related content should be arranged into an arcuate pattern around a right upper corner of a GUI, while email message content is displayed in a second arcuate pattern around a left upper corner of the GUI.

FIG. 32 illustrates another GUI that comprises a third layer of selectable objects 3035. This GUI may be displayed when one of the second plurality of selectable objects 3020 is selected by a user. Alternatively, if the user selects one of the first set of icons 3025, the selectable object associated therewith may be displayed in the display area 3015.

When one of the second plurality of selectable objects 3020 is selected by a user, the second plurality of selectable objects 3020 are transformed into another arcuate grouping of selectable icons 3040. The arcuate grouping of selectable icons 3040 are likewise positioned around the corner 3030 of the GUI 3000. Additionally, the first set of icons 3025 are reduced in size and moved closer to the corner of the GUI 3000. In some instances the shrinking occurs logarithmically as described in greater detail above.

The first set of icons 3025 and arcuate grouping of selectable objects 3040 (e.g., a second set of icons) form an annular or ring shaped pattern. Additional layers can be displayed and transformed into arcuate groupings of selectable objects as described above for fourth, fifth, sixth, or higher level layers.

According to some embodiments, the first set of icons 3025 are arranged about a corner 3030 of the GUI and the second set of icons are arranged about a second corner 3045 of the GUI, rather than being arranged in an annular pattern.

Also, rather than being positioned around a corner of the GUI, selectable objects or icons may be arranged in an arcuate pattern around a top, bottom, or side of the GUI 3000, as illustrated in FIG. 32, where an arcuate grouping of selectable objects 3050 is illustrated.

It is also noteworthy to mention that layers of arcuate patterned icons and selectable objects have a hierarchical relationship to one another. For example, in FIG. 32 the first set of icons 3025 are related to the second set of icons of the arcuate grouping of selectable objects 3040. Further, the second set of icons of the arcuate grouping of selectable objects 3040 are related to the third layer of selectable objects 3035.

In some embodiments, the first and second sets of icons have a circular shape, although other shapes such as squares, triangles, irregular shapes, or any other shape that would be known to one of ordinary skill in the art may also likewise be utilized.

Advantageously, in some embodiments, the first set of icons 3025 are at least partially transparent such that when positioned over the second plurality of selectable objects the second plurality of selectable objects 3020 underneath the first set of icons 3025 are at least partially visible through the first set of icons 3025.

Figures 33, 34:
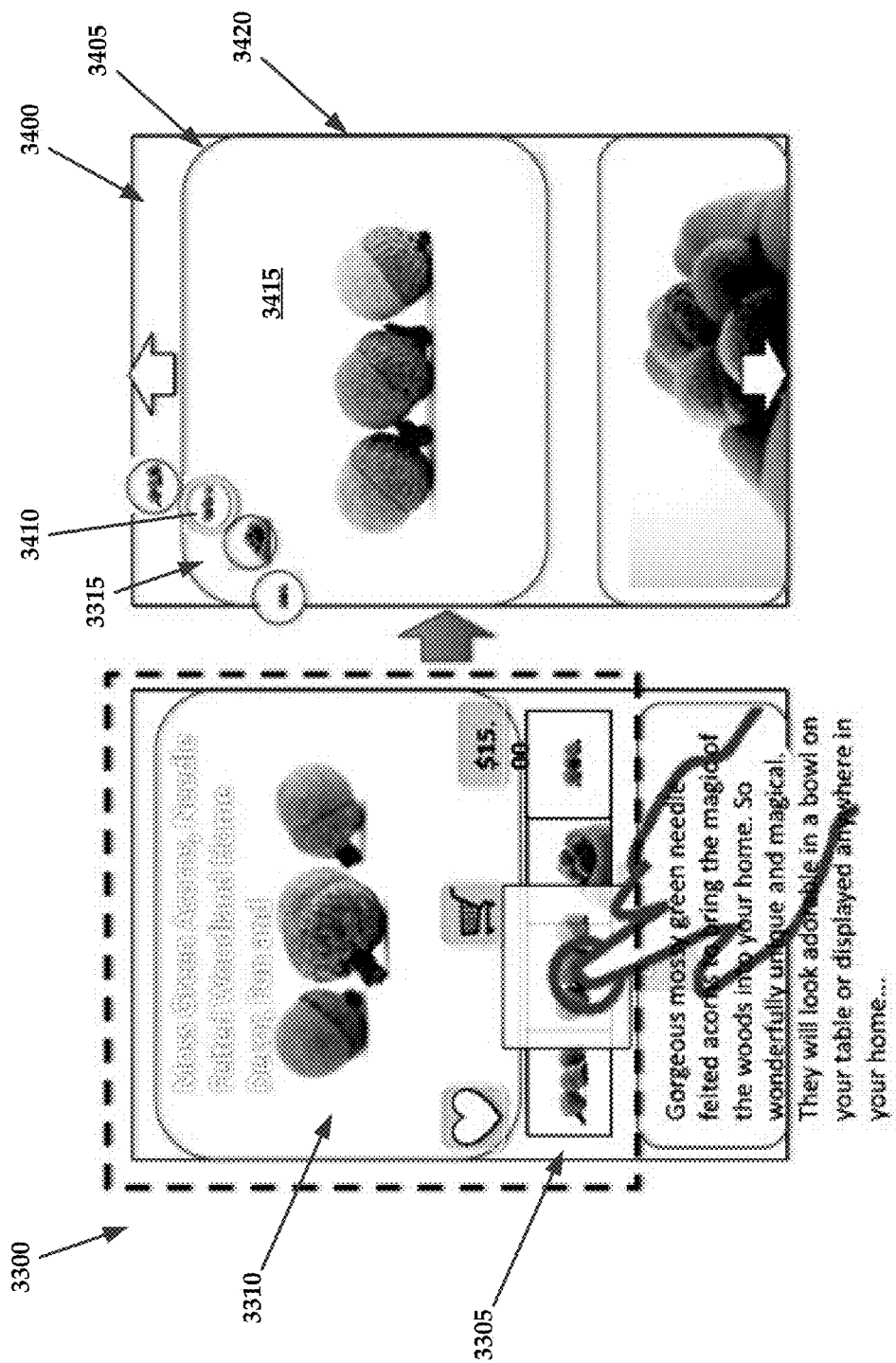
FIG. 33 illustrates a GUI that shows the selection of one of a plurality of selectable objects disposed on a first layer of the GUI.
FIG. 34 illustrates a GUI that includes an arcuate grouping of selectable objects that are disposed on a second layer, above a first layer.

FIG. 33 illustrates a GUI 3300 that shows the selection of one of a plurality of selectable objects 3305 disposed on a first layer of the GUI 3300. One of the plurality of selectable objects 3305 being selected by the user is also displayed in a primary display area 3310 of the GUI 3300. Once selected, the plurality of selectable objects 3305 is transformed into a first set of icons 3315 on a second GUI 3400 of FIG. 34. FIG. 34 illustrates a plurality of selectable objects displayed in a vertically aligned format 3405. When an icon, such as icon 3410 is selected, the larger selectable object 3415 is displayed in the primary frame 3420 of the second GUI 3400. Scrolling through the vertically aligned set of selectable objects causes rotation of the icons. Likewise, scrolling through the icons causes vertical scrolling through the vertically aligned set of selectable objects. For example, counter clockwise rotation of the icons causes the selectable object 3415 to translate downwardly.

Also, the selectable object that is currently displayed within the primary frame 3420 of the second GUI 3400 corresponds to an icon that is highlighted. The highlighting of the icon may include a colored ring placed around the icon or a slight enlargement of the icon, a blinking of the icon, or combinations thereof. Other methods for visually distinguishing a selected icon are also likewise contemplated for use.

Figure 35:
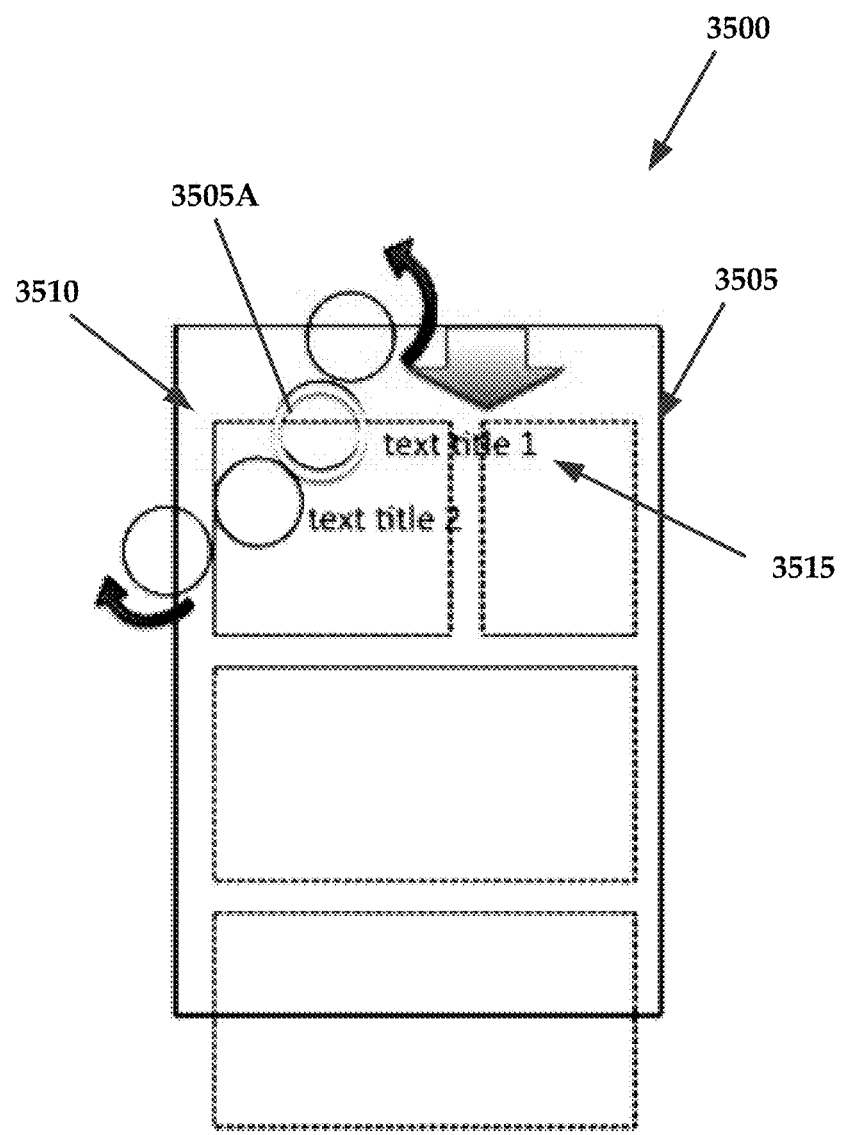
FIG. 35 illustrates the display of text or indicia, which are associated with two of the selectable objects in the arcuate pattern.

FIG. 35 illustrates the display of text or indicia, which are associated with two of the selectable objects in the arcuate pattern. A GUI 3500 includes a layer of selectable objects 3505 having a first layout. A second layer of selectable objects (e.g., icons) 3510 are provided in a second layout, which includes an arcuate layout. This figure illustrates that the first and second layers remain active, selectable, and movable at the same time. The second layer of selectable objects 3510 can be rotated independently from movement of the layer of selectable objects 3505. Thus, rotation of the second layer of selectable objects 3510 does not cause the rotation of the layer of selectable objects 3505.

Also, textual content or indicia associated with one or more of the layer of selectable objects 3505 is shown. For example, when selectable object 3505A is selected, textual content 3515 is displayed proximate the selectable object 3505A. The textual content may be descriptive of the subject matter or content associated with the selectable object 3505A.

Figure 37:
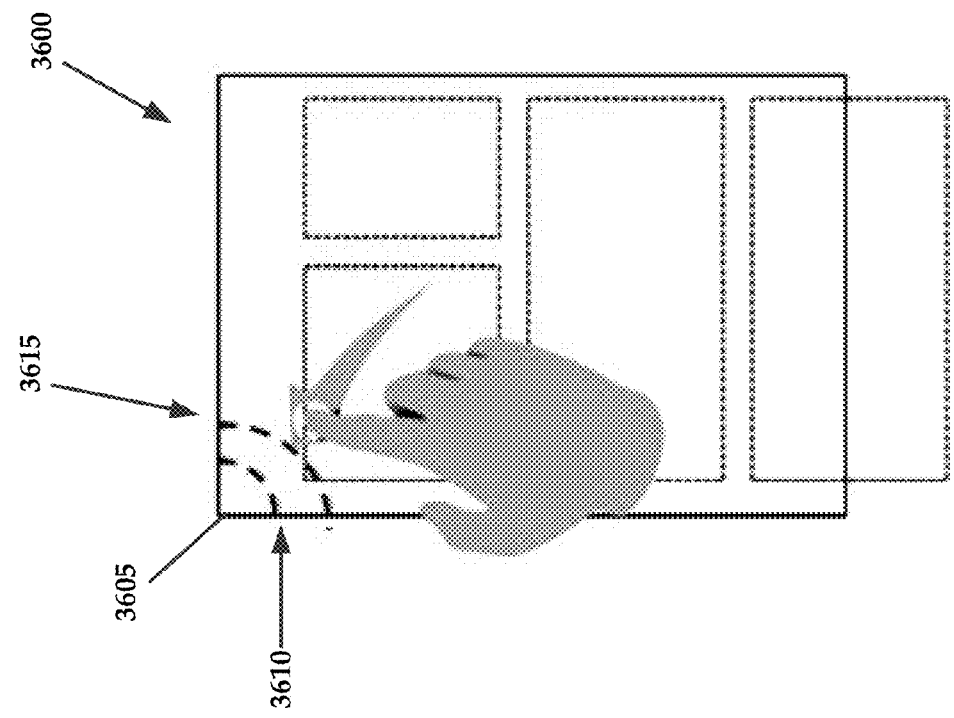
FIG. 37 illustrates a shrinking or expanding of the size of the arcuate grouping of selectable objects due to a swipe gesture received from a user.
Figure 36:
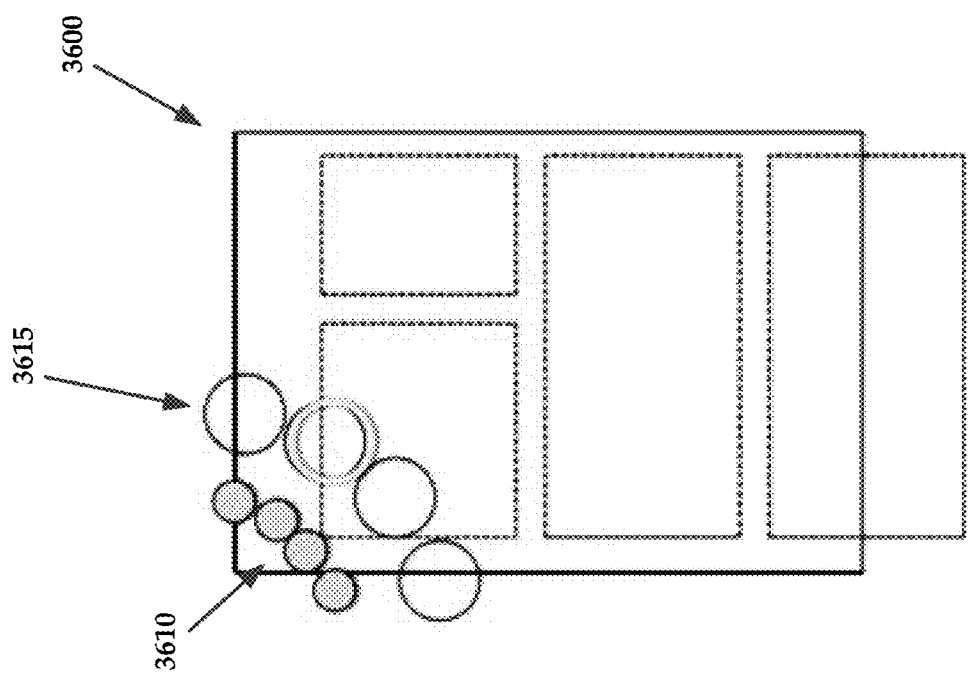
FIG. 36 illustrates a GUI that includes two groups of selectable objects arranged into arcuate groupings.

FIG. 36 illustrates is a GUI 3600 that includes two groups of selectable objects arranged into arcuate groupings. FIG. 37 illustrates a shrinking or expanding of the size of the arcuate grouping of selectable objects within the GUI 3600 due to a swipe gesture received from a user. When a user makes a swipe gesture in the direction of a corner 3605 of the GUI 3600, both arcuate arrangements of selectable objects 3610 and 3615 are collapsed by reducing the size of the objects and reducing the radius of the arc of the objects relative to the corner 3605. The collapsed objects can be enlarged by a swipe direction in an opposing direction as the one utilized to collapse the objects.

Figure 40:
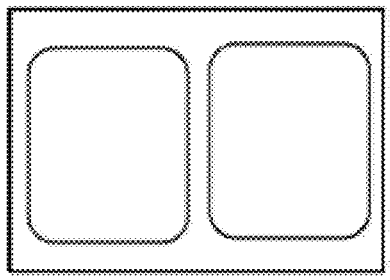
FIGS. 38-42 collectively illustrate various layouts of selectable objects for a first layer of GUIs that is constructed in accordance with the present technology.
Figure 42:
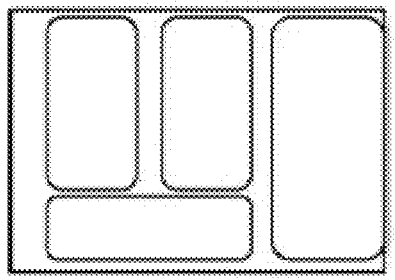
Figure 39:
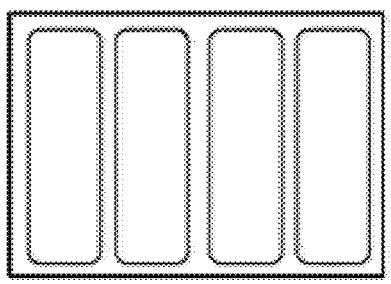
Figure 41:
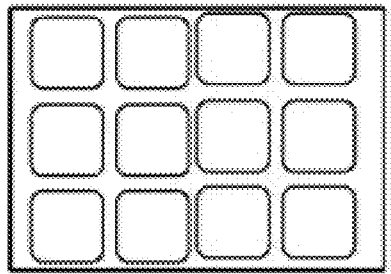
Figure 38:
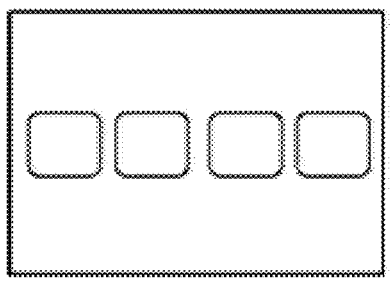

FIGS. 38-42 collectively illustrate various layouts of selectable objects for a first layer of a GUI, such as the selectable objects that are displayed in a primary display of the GUI. FIGS. 38-40 illustrate various levels of enlargement of the same selectable objects which are vertically aligned. FIGS. 41 and 42 are various grid-type arrangements (e.g., layouts) of selectable objects.

Figure 43:
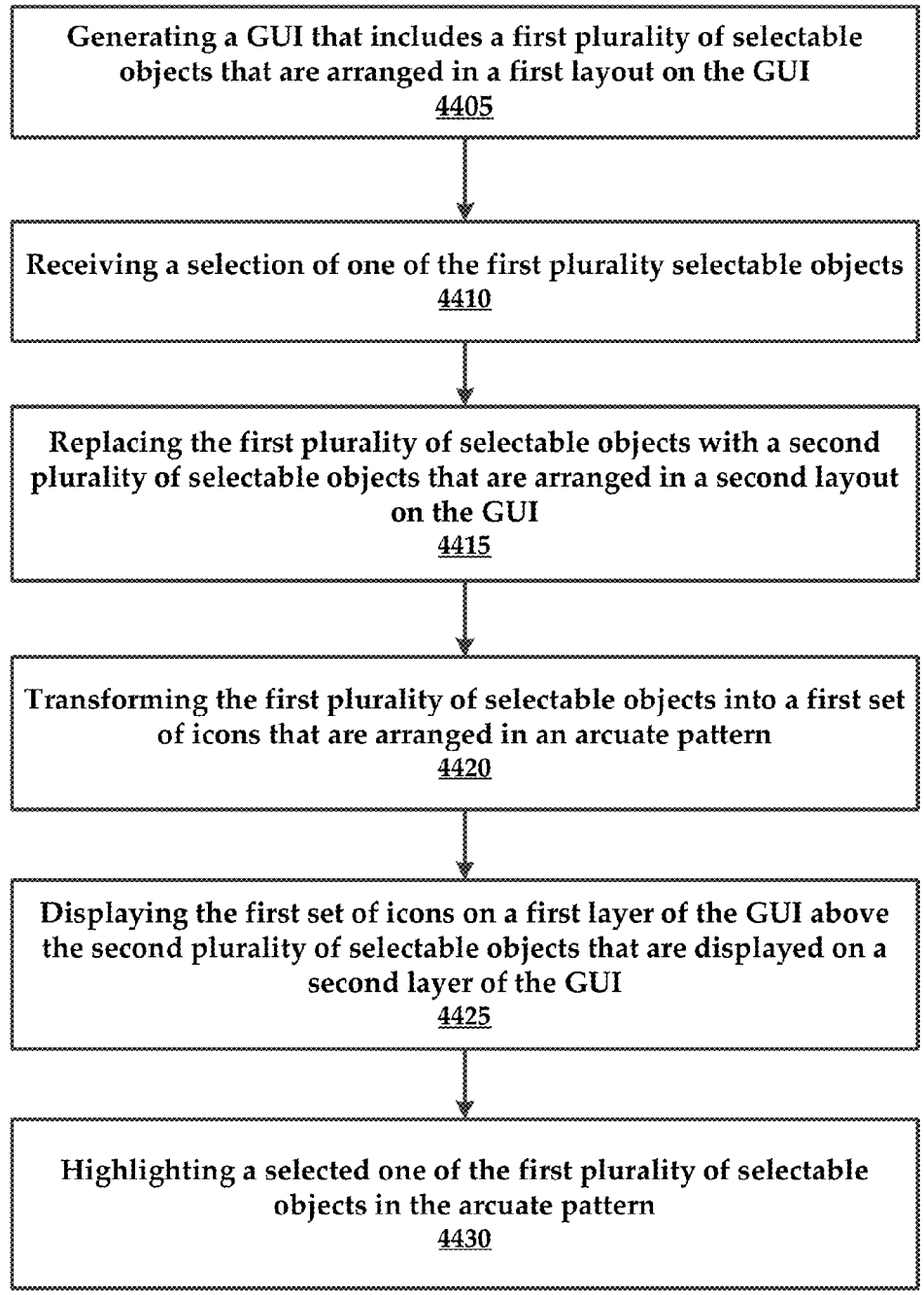
FIG. 43 is a flowchart of a method for providing a graphical user interface (GUI) that includes an arcuate arrangement of selectable objects.

FIG. 43 is a flowchart of an exemplary method for providing a graphical user interface (GUI). As mentioned above, the method may be executed by a computing device that comprises a processor and a memory for storing logic. The computing device executes the logic to perform the method. In some embodiments, the method includes generating 4405 a GUI that includes a first plurality of selectable objects that are arranged in a first layout on the GUI. The method also includes receiving 4410 a selection of one of the first plurality selectable objects. Upon selection, the method includes replacing 4415 the first plurality of selectable objects with a second plurality of selectable objects that are arranged in a second layout on the GUI. Again, the second layout may be different in visual appearance from the first layout.

Additionally, the method includes transforming 4420 the first plurality of selectable objects into a first set of icons that are arranged in an arcuate pattern. It will be understood that the first set of icons may include shrunken versions of the first plurality of selectable objects. The first set of icons may have different shapes from the first plurality of selectable objects. For example, the first plurality of selectable objects may be displayed as large rectangles. These selectable objects are transformed into smaller circular icons. Again, it will be noted that the icons are also selectable.

In some embodiments, the method includes displaying 4425 the first set of icons on a first layer of the GUI above the second plurality of selectable objects that are displayed on a second layer of the GUI.

In some embodiments, the method may include highlighting 4430 a selected one of the first plurality of selectable objects in the arcuate pattern.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be communicatively coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for maximizing of a viewing area for visually perceptible icons displayed on a touchscreen graphical user interface (GUI) of a personal digital assistant, the method comprising:
   generating the GUI that includes a first plurality of selectable objects that are arranged in a first layout on the GUI;
   receiving a selection of one of the first plurality of selectable objects;
   replacing the first plurality of selectable objects with a second plurality of selectable objects that are arranged and displayed in a second layout on the GUI, the second layout being different in visual appearance from the first layout;
   transforming the first plurality of selectable objects into a first set of icons that are arranged in an arcuate pattern, the first set of icons being shrunken versions of the first plurality of selectable objects;
   displaying the first set of icons in the arcuate pattern on the GUI above the second plurality of selectable objects that are displayed in the second layout of the GUI, the displayed first set of icons in the arcuate pattern and the second plurality of selectable objects in the second layout fully filing a window displayed on the touchscreen graphical user interface (GUI) of the personal digital assistant; wherein the selection of the one of the first plurality of selectable objects includes any of a click, a tap, a swipe, a gesture, a sound-based command and a motion-based command; the replacing, the transforming and the displaying performed in a visually perceptible morphing fashion with no visually perceptible hard jumping; and highlighting the selected one of the first plurality of selectable objects in the arcuate pattern.

2. The method according to claim 1, further comprising:
   receiving a selection of one of the second plurality of selectable objects;
   replacing the second plurality of selectable objects with a third plurality of selectable objects that are arranged in a third layout on the GUI;
   shrinking the first set of icons; and
   transforming the second plurality of selectable objects into a second set of icons that are arranged in an arcuate pattern, the second set of icons being displayed in the first layout above the third plurality of selectable objects, the second set of icons and the first set of icons being arranged in an annular pattern.

3. The method according to claim 2, wherein the first set of icons are arranged about a first corner of the GUI and the second set of icons are arranged about a second corner of the GUI, rather than being arranged in an annular pattern.

4. The method according to claim 1, wherein each of the first plurality of selectable objects comprises a first shape and each of the second plurality of selectable objects comprises a second shape, wherein the second shape and the first shape are different from one another.

5. The method according to claim 1, wherein the first set of icons are at least partially transparent such that when positioned over the second plurality of selectable objects, the second plurality of selectable objects underneath the first set of icons are at least partially visible through the first set of icons.

6. The method according to claim 1, further comprising collapsing the first set of icons upon receiving a swipe gesture.

7. The method according to claim 6, further comprising enlarging the collapsed first set of icons with an opposing swipe gesture.

8. The method according to claim 1, further comprising displaying textual content associated with an icon when the icon is selected.

9. A computing device, comprising:
   a processor; and
   a memory for storing logic, the logic being executed by the processor to provide a graphical user interface (GUI) by:
      generating the GUI that includes a first plurality of selectable objects that are arranged in a first layout on the GUI;
      receiving a selection of one of the first plurality of selectable objects;

replacing the first plurality of selectable objects with a second plurality of selectable objects that are arranged and displayed in a second layout on the GUI, the second layout being different in visual appearance from the first layout;

transforming the first plurality of selectable objects into a first set of icons that are arranged in an arcuate pattern, the first set of icons being shrunken versions of the first plurality of selectable objects;

displaying the first set of icons in the arcuate pattern on the GUI above the second plurality of selectable objects that are displayed in the second layout of the GUI, the first set of icons in the arcuate pattern and the second plurality of selectable objects in the second layout fully filing a window displayed on the graphical user interface (GUI); wherein the selection of the one of the first plurality of selectable objects includes any of a click, a tap, a swipe, a gesture, a sound-based command and a motion-based command; the replacing, the transforming and the displaying performed in a visually perceptible morphing fashion with no visually perceptible hard jumping; and highlighting the selected one of the first plurality of selectable objects in the arcuate pattern.

10. The computing device according to claim 9, wherein the processor further executes the logic to perform operations comprising:

receiving a selection of one of the second plurality of selectable objects;

replacing the second plurality of selectable objects with a third plurality of selectable objects that are arranged in a third layout on the GUI;

shrinking the first set of icons; and transforming the second plurality of selectable objects into a second set of icons that are arranged in an arcuate pattern, the second set of icons being displayed in the first layout above the third plurality of selectable objects, the second set of icons and the first set of icons being arranged in an annular pattern.

11. The computing device according to claim 9, wherein each of the first plurality of selectable objects comprises a first shape and each of the second plurality of selectable objects comprises a second shape, wherein the second shape and the first shape are different from one another.

12. The computing device according to claim 9, wherein the first set of icons are at least partially transparent such that when positioned over the second plurality of selectable objects the second plurality of selectable objects underneath the first set of icons are at least partially visible through the first set of icons.

13. The computing device according to claim 9, wherein the processor further executes the logic to perform operations comprising collapsing the first set of icons upon receiving a swipe gesture.

14. The computing device according to claim 13, wherein the processor further executes the logic to perform operations comprising enlarging the collapsed first set of icons with an opposing swipe gesture.

15. The computing device according to claim 9, wherein the processor further executes the logic to perform operations comprising displaying textual content associated with an icon when the icon is selected.

* * * * *